(12) United States Patent
Ethington

(10) Patent No.: US 9,219,793 B2
(45) Date of Patent: Dec. 22, 2015

(54) WORD DESCRIPTION APP FOR SOCIAL STATUS INSIGHTS

(71) Applicant: Justin Ethington, Bluffdale, UT (US)

(72) Inventor: Justin Ethington, Bluffdale, UT (US)

(73) Assignee: Justin C. Ethington, Bluffdale, UT (US)

( * ) Notice: Subject to any disclaimer, the term of this patent is extended or adjusted under 35 U.S.C. 154(b) by 188 days.

(21) Appl. No.: 14/187,222

(22) Filed: Feb. 21, 2014

(65) Prior Publication Data

US 2015/0244829 A1 Aug. 27, 2015

(51) Int. Cl.
*G06F 3/00* (2006.01)
*H04L 29/08* (2006.01)
*G06F 3/0484* (2013.01)
*G06F 17/30* (2006.01)

(52) U.S. Cl.
CPC .......... *H04L 67/306* (2013.01); *G06F 3/04842* (2013.01); *G06F 17/3053* (2013.01)

(58) Field of Classification Search
CPC .................................................... H04L 67/306
USPC ....................................................... 715/753
See application file for complete search history.

(56) References Cited

U.S. PATENT DOCUMENTS

| | | | |
|---|---|---|---|
| 8,296,323 B2* | 10/2012 | Pollard | G06Q 10/0637 705/44 |
| 2010/0185656 A1* | 7/2010 | Pollard | G06F 17/30578 707/769 |
| 2010/0186066 A1* | 7/2010 | Pollard | G06Q 20/40 726/3 |
| 2011/0040736 A1* | 2/2011 | Kalaboukis | G06F 21/6245 707/694 |
| 2012/0079019 A1* | 3/2012 | Miettinen | G06Q 50/00 709/204 |
| 2013/0073389 A1* | 3/2013 | Heath | G06Q 50/01 705/14.54 |
| 2013/0073400 A1* | 3/2013 | Heath | G06Q 30/02 705/14.73 |
| 2013/0073473 A1* | 3/2013 | Heath | G06Q 30/02 705/319 |

* cited by examiner

*Primary Examiner* — William Titcomb

(57) ABSTRACT

The present invention relates to a social media app that allows users to select words to describe one another. The database query structure of the system (app) remembers the words used to describe the users and the connections between users and can then match up descriptions and relationships to tell users their public image, and to provide social status insights and whom they tend to attract in their social circles.

20 Claims, 40 Drawing Sheets

WORD DESCRIPTION APP FOR SOCIAL STATUS INSIGHTS

REFERENCE TO RELATED APPLICATION

This patent application claims the benefit of U.S. Provisional Application No. 61/767,353 filed on Feb. 21, 2013, the disclosure of which is incorporated herein by reference in its entirety.

BACKGROUND OF THE INVENTION

1. Field of the Invention

The present invention relates to methods of and systems for providing social status insights. More particularly, the present invention relates to methods that show users how others see them by providing a platform that combines word association choices with relationship structure recognition to give users a view of themselves.

2. Description of Related Art

The internet and social media platforms (e.g., Facebook®, Twitter®, blogs) provide an easy-to-use interface for people to interact with one another. Typically, members of social media platforms construct profiles, which may include personal information such as name, contact information, photographs, personal messages, etc. The social media sites allow members to identify and establish links or connections with other members in order to build or reflect social networks or social relations among members. However, people tend to have no clear idea how they are viewed by others. Their self image may be different from the one that other people perceive. Thus, it is necessary to have a system or method to help people see how they are viewed in their friends' eyes and understand better their public image and social status. Therefore, it is necessary to have a system and method that correlates the opinions or views in the group/circle. Moreover, it is necessary to have a system and method that can tell users who in the group/circle may be their ideal best friends, etc.

SUMMARY OF THE INVENTION

One primary object of the present invention is to help people understand how other people perceive them, their public image and social status, and the type of people they attract.

The present invention relates to a social media app that allows users to select words to describe one another. The database query structure of the system (app) remembers the connections between users and can then match up descriptions and relationships to tell users things like:

How do different groups of people describe me?
What type people do I tend to attract?
Who in my social circle is most known for various personality attributes?
Who would be an ideal mate? Or ideal friend?
Who is most/least like me in my circle?

Unlike standard social media, personality tests or workplace peer reviews, this platform combines word association choices with relationship structure recognition to give users a view of themselves that current technology doesn't provide. Its database structure takes all nodes in the database and examines them from all different perspectives, including individual to group, group to individual, group to group, and individual to individual.

The present invention is meant to be viral, social-media focused, and mobile. It benefits users of the present invention to understand how they are really perceived, to know if the image they try for is really what they project, to learn how different kinds of people perceive them, to see the type of person they tend to attract, and to understand their places in their social circles.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

FIG. 6 is a screenshot of app button pushed (uncovered)
FIG. 8 is a screenshot of a friend's profile showing their ranked descriptions, trophies, flash insights.

FIG. 10 shows two screenshots of cute couple matching and ranking wherein database queries show user's most frequently suggested cute couple relationships.

FIG. 11 shows two screenshots of award trophies

FIG. 17 shows leader board screenshot wherein DB queries show top ranked friends per description word and the can be filtered.

FIG. 18 shows the guru report (cover) and the mega leader board wherein DB queries show % of word leader who described the user with the same word.

FIG. 23 shows the compare 5 report screen (cover) which lists what each person is most famous for.

FIG. 29 shows the build a crush screen 1.

FIG. 32 shows the build a friend screen 1.

DESCRIPTION OF THE PREFERRED EMBODIMENT

The system and method of the present invention relates to a mobile device app that shows users how people see them and what they are famous for.

In an exemplary embodiment of the present invention, there is disclosed a method and system of an app that shows users how others see them by providing a platform that combines word association choices with relationship structure recognition to give users a view of themselves. This platform works by 1. Remembering and ranking words assigned to each user; 2. remembering relationships between users; and 3. using specialized database queries to display insights about how users are connected and how they view one another.

Figure 1A:
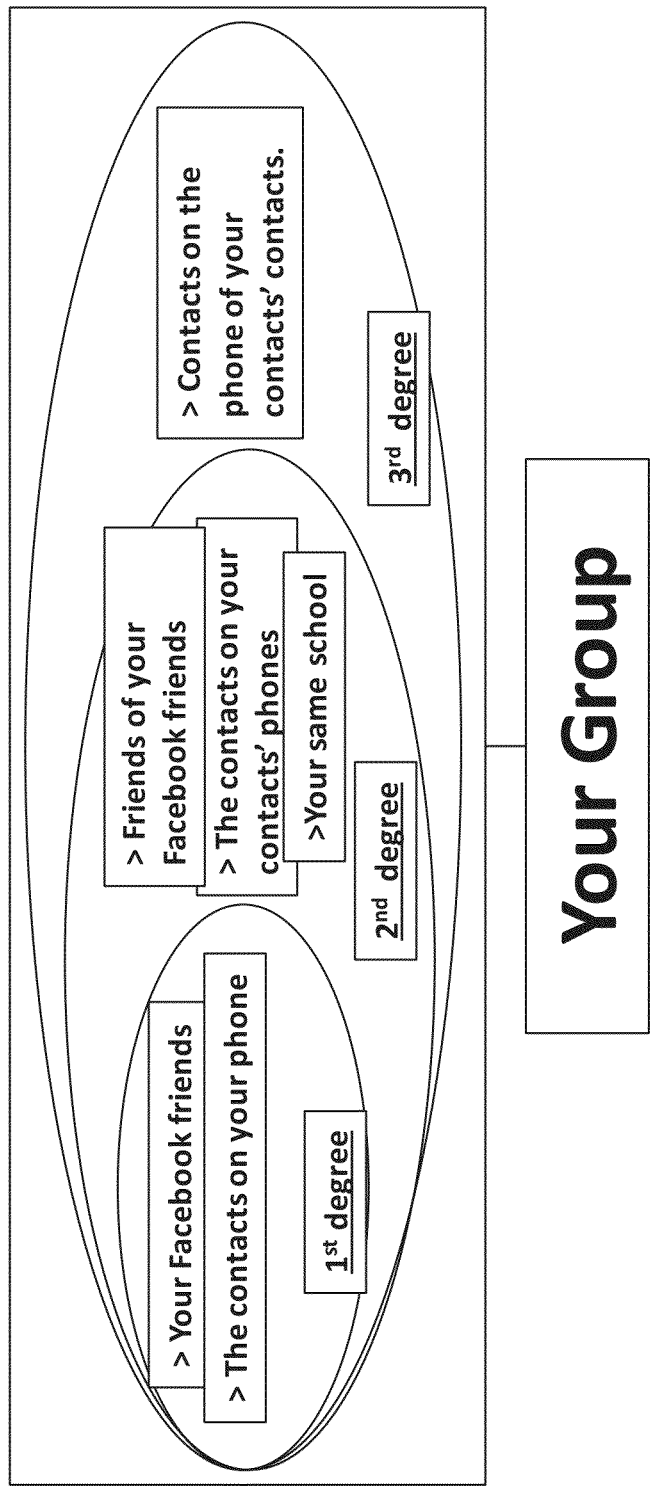
FIG. 1A shows relationship degrees.
Figure 1B:
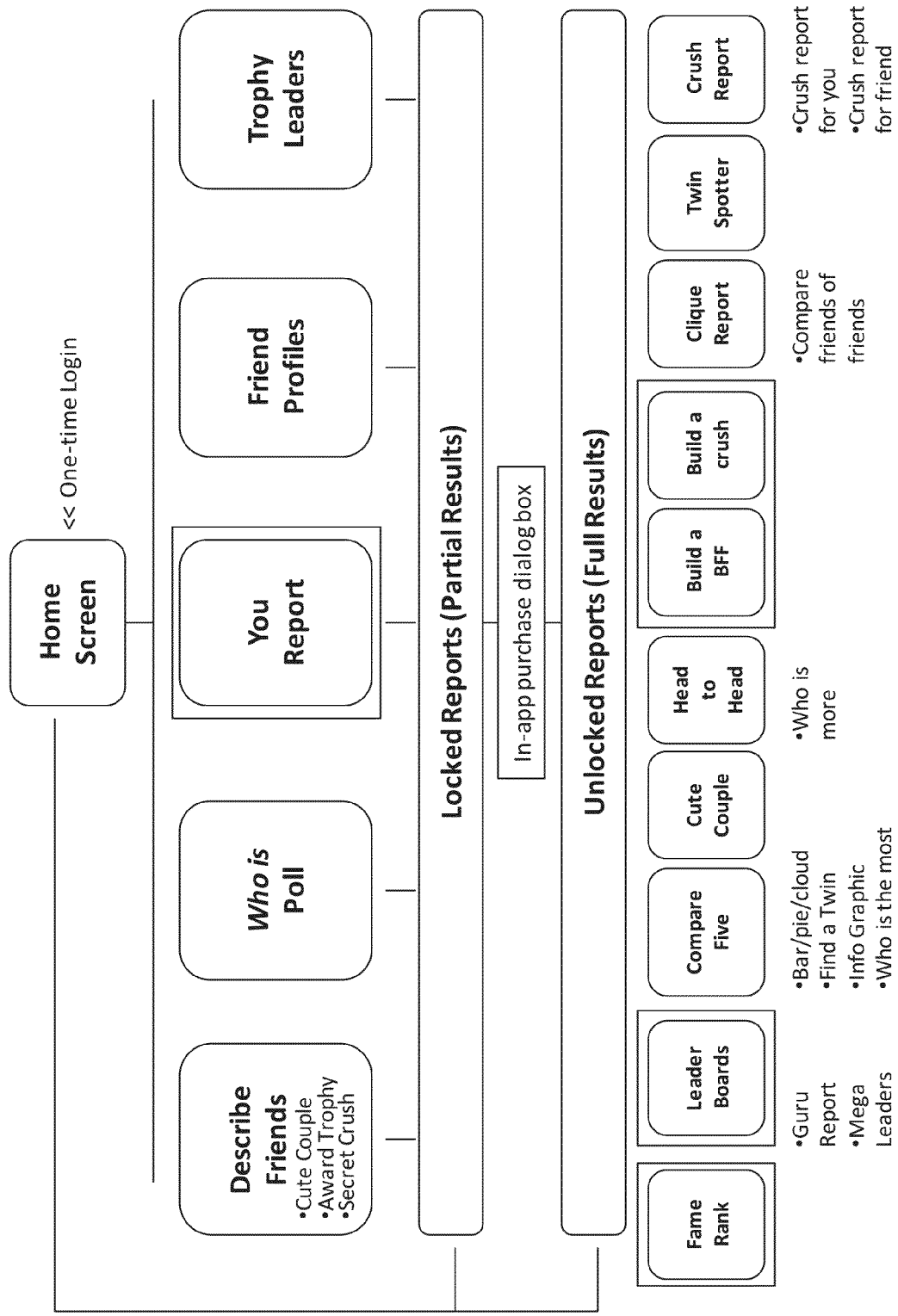
FIG. 1B is a navigation of the system/method of the present invention.
Figure 1C:
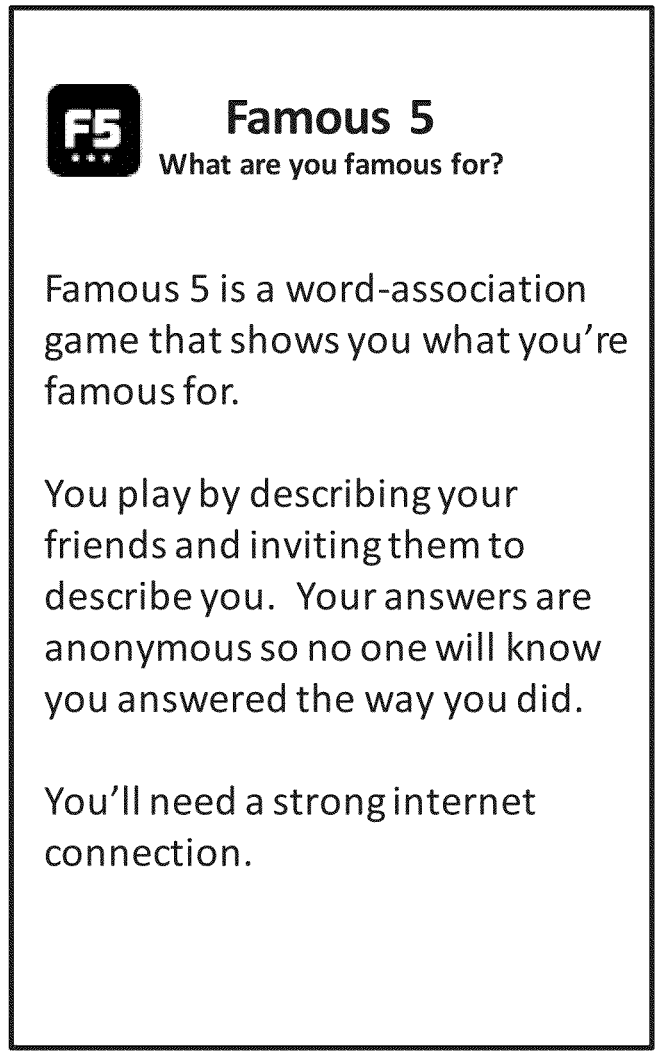
FIG. 1C is a splash.

Referring to FIG. 1C, the user is provided with a splash screen that introduces the game. The app lets users choose words that best describe their friends. Also, their friends can choose words to best describe the users. The information collected can be used by database queries to convert into interesting insights. It is known in social media that friends can be classified (or grouped or divided into) three categories.

The app of the present invention is a word-association game. Users play by describing their friends and inviting them to describe him/her using words selected from a list of words generated and provided by the app. The answers provided are anonymous.

Referring to FIG. 1A, the first-degree friends include users' Facebook® friends and the contacts on users' phone. The second-degree friends are friends of users' Facebook® friends, the contacts on users' contacts' phones, and users' friends from same school. The third-degree friends are the contacts on the phone of users' contact's contacts.

Referring to FIG. 1B, the system and method (app) allows users to describe themselves, describe their friends, vote for the "who is poll", and give trophy to their friends, etc. Based on the entries made (selected), the system creates a locked report which contains full results. The locked report is only partially revealed to users. If users want to see the full results, they need to make in-app purchase to unlock the report. More details will be described later.

Figure 2:
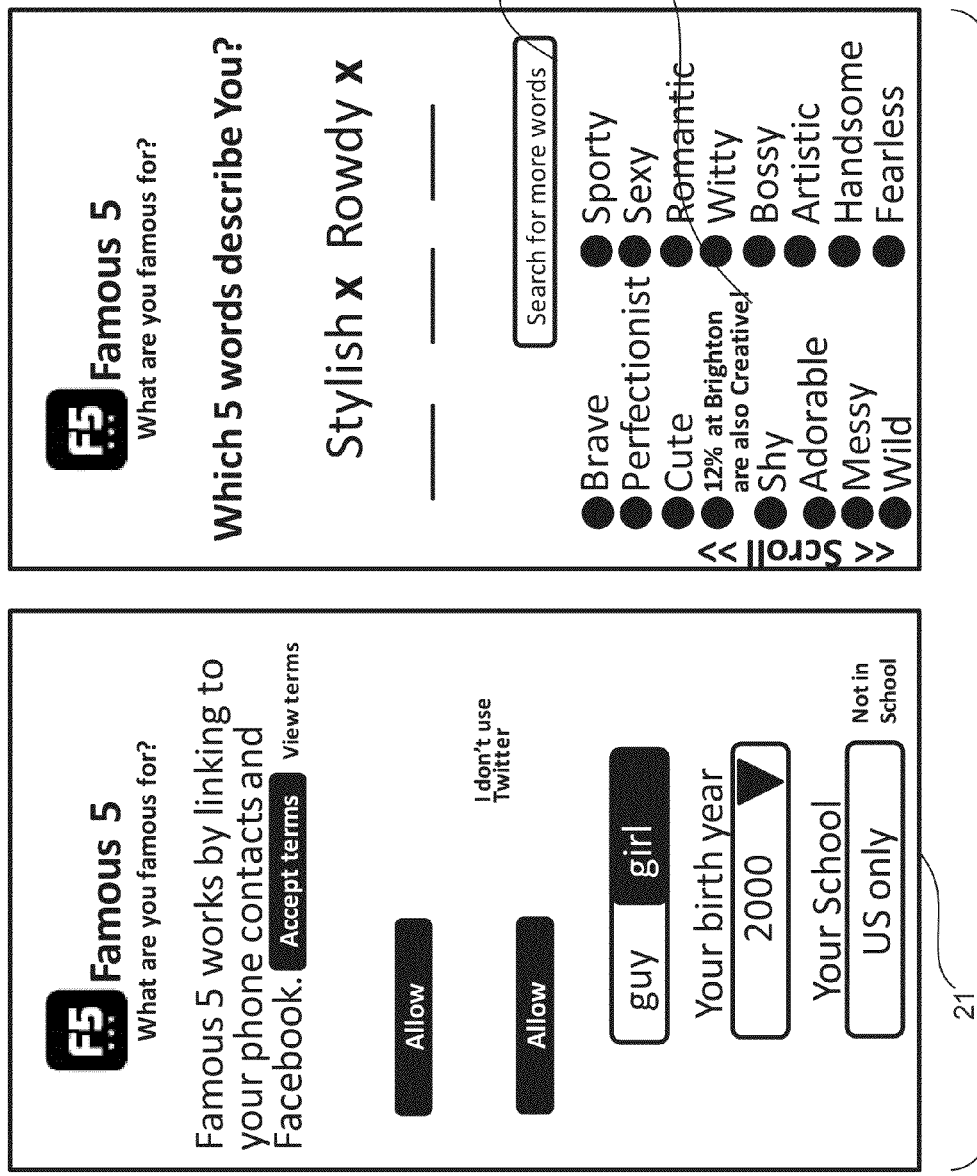
FIG. 2 is a screenshot of log-in screen.

In the Log-in screen as shown in FIG. 2, all fields are grayed out until terms are accepted. The terms include permissions to use the contact list and send notifications.

In the Log-in screen, users enter their information including school they attend and giving permission for the app to use the contact list and send notification. The auto-fill search box 21 is lists all public and private schools.

The app provides words for users to select from to best describe themselves. The words are randomly generated from a list of about 100 words. The search box 22 auto-fills from a list of 100's of more of words.

Whenever the user select a word the app tells the user how many (in percent) 23 of their friends also chose the same word. In this example, 12% at Brighton also chose the word "creative" to describe themselves.

Figure 3:
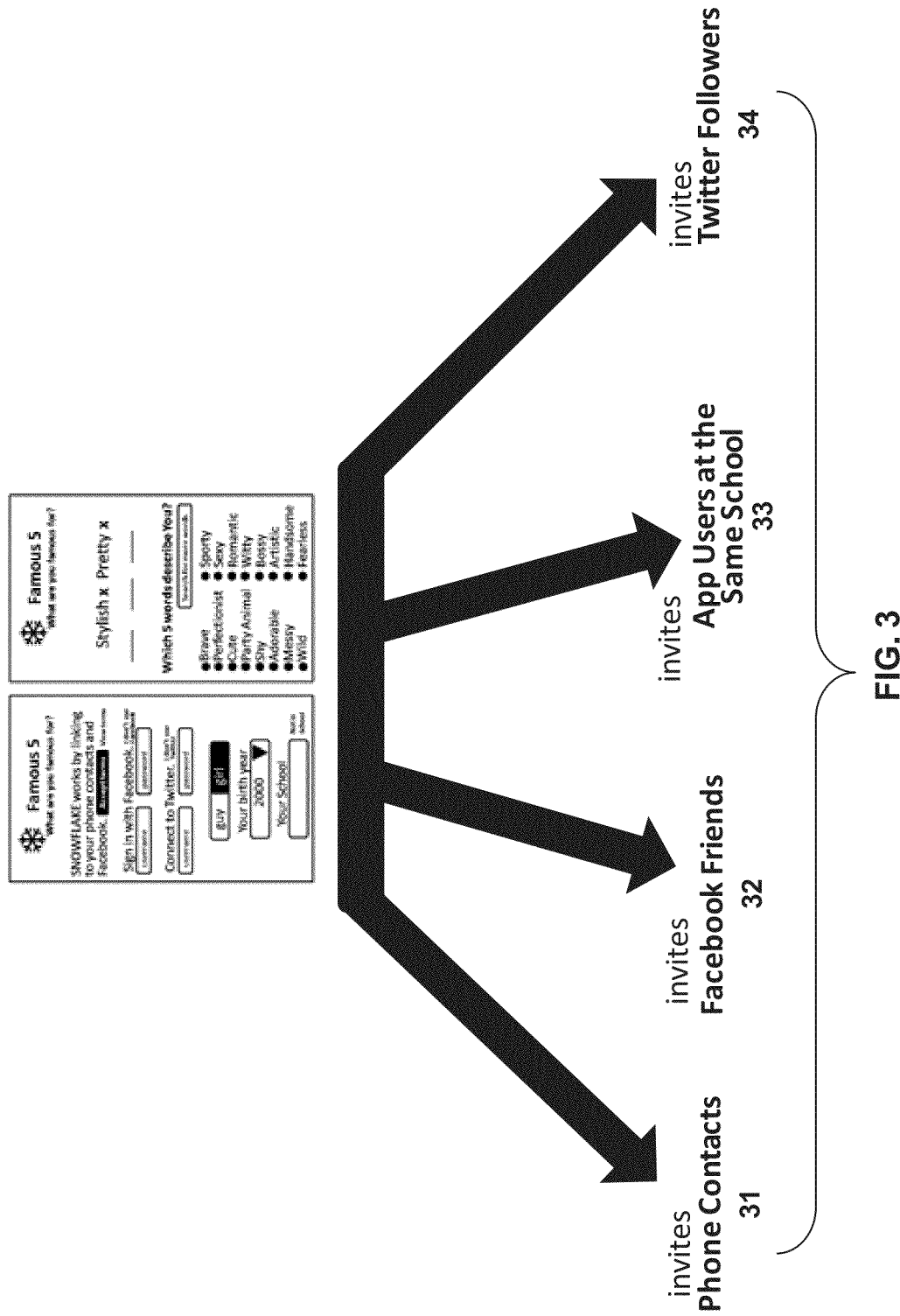
FIG. 3 is a screenshot showing notifications sent to users' friends showing the connections are recorded and notifications sent to other/new users.

After users log in to the app for the first time and describe themselves, a number of invites are sent out by the system. (See FIG. 3)

The app collects the names and phone numbers of the contacts on the phone 31. The app then sends a text to each contact that says:

Max Sullivan used Famous 5—a game that shows him how friends really see him. Max is Silly, Athletic, Loud, Sexy and Party Animal. Do you agree?

>Links to the appropriate app download (Android, iOS, etc)

The app posts users' description about themselves on their Facebook page 32 and it shows in their friends' newsfeeds.

Max Sullivan used Famous 5 to learn how people really see him. Max is Silly, Athletic, Loud, Sexy and Party Animal. Do you agree?

>Links to the Famous 5 FB page with a "send to mobile" button.

Using the in-app notification of the present invention 33, a message goes out to other users of the app of the present invention at the same school.

Max Sullivan used Famous 5 to learn what he's famous for. Max is Silly, Athletic, Loud, Sexy and Party Animal. Do you agree?

>Takes user to Max's profile page

Users' Twitter account 34 posts the following Tweet:

I just used Famous 5—a game that shows me how friends really see me. I'm Silly, Athletic, Loud, Sexy and Party Animal. Do you agree?

>Links to the appropriate app download (Android, iOS, etc)

Figure 4:
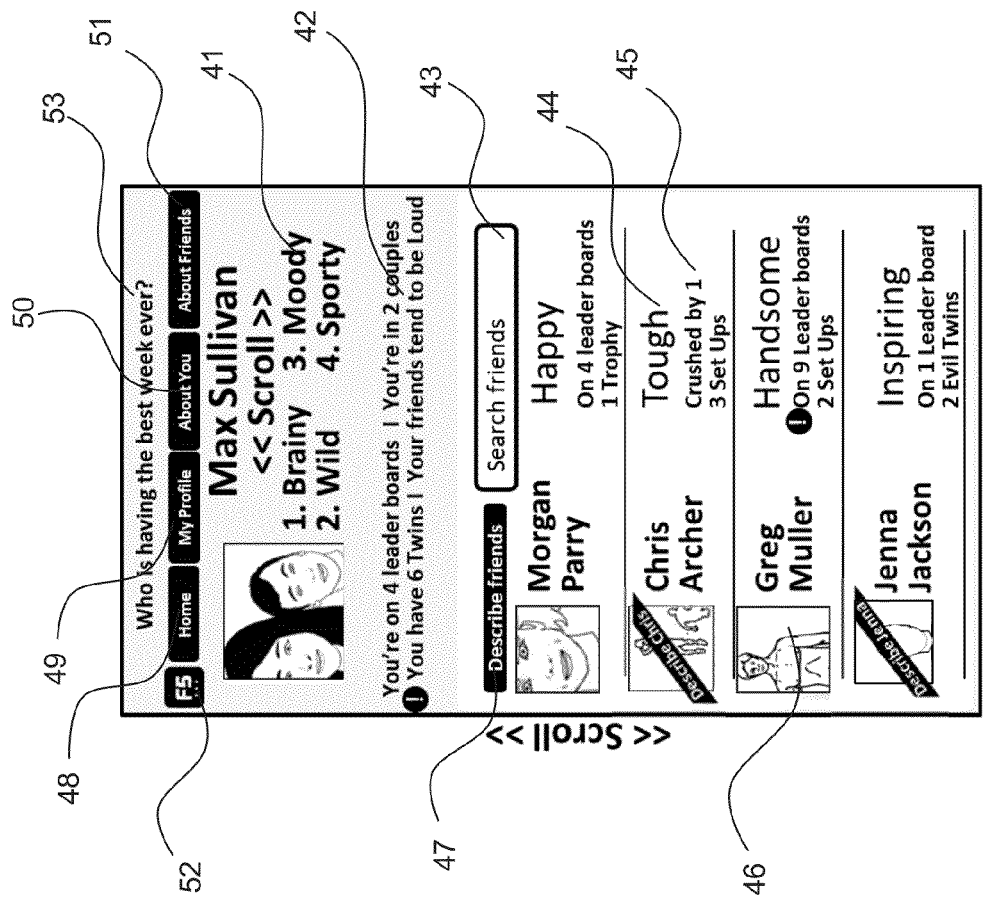
FIG. 4 is a home screen after log in and when the app opens wherein 15-30 database queries about the user and her friends presented as flash updates.

Referring to FIG. 4, there is disclosed a home page of the app of the present invention. The page shows the current list of words 41 most attributed to the user. Scrolls horizontal to show more words. The page also shows notification of quick stat changed in the past 3 days 42. Using Max Sullivan as an example, his home page shows that Max is on 4 leader boards, 2 couples, Max has 6 twins and his friends tend to be loud. Every 15 seconds, the quick stats refresh to rotate quick stats from a set of different stat types. Too see all of the different stat types Max Sullivan's has (for ex. 4 trophies; he lost 2 trophies; 2 leaders says he is funny; he is not hyper; his friends tend to be divas; his crushes tend to be sporty; he moved up in 2 leader boards; he owns 3 "Diva" trophies; he has 3 evil twins; he is crushed on by 3; etc) he can click on the About You tab on top. Max can see more of his friends by scrolling down on the page.

In home page users can do search 43 to find a specific friend among all his friends. For the friends that have not been profiled by the user, the system puts banners on to remind the user. The friends are listed in the order of the first-degree, second-degree, and third-degree. The $1^{st}$ degree friends are in the order of friends in the phone contact list, and friends in Facebook®. The order may also be based on whether a friend has not had anyone complete their profile or how many times they have paid. The pictures of the user and friends can be the one uploaded on Facebook® or photo contact list.

A new word 44 which describes the friends flashes every 15 seconds if it has been selected for this person. Flashes are staggered starting from top and going to bottom like an old train schedule sign board. Same set of quick stats 45 also apply to users' friends; it also refresh every 15 seconds.

Clicking an icon of a friend 46 opens their profile page. Clicking the Describe Friends 47 opens the friend description screen for the user to start to profile the friend selected.

Figure 5:
FIG. 5 is a screenshot of "Who is" poll wherein App administrators poll users and users answer by selecting friends.

On top of the screen is a "who is" poll 53 for the users to vote for. In this example, the "who is" poll asks "who is having the best week ever?" The user can select one of his friends. When users click "who is" poll 53 a "Who is?" question screen will appear as shown in FIG. 5. "Who Is?" allows app administrators to upload a question as often as we would like. Users can then answer the question by choosing a person in their group. To see the results users submit their answer and a screen slides in to show results (1 to infinity). The results are based on % and can be filtered by gender and friend degree.

Referring back to FIG. 4, the Home button 48 takes the user to the user's home page. The My Profile button 49 takes the user to the user's Report. The About You button 50 shows the user the reports the user can see about them. The About Friends button 51 shows the user the list of reports the user can see about their friends.

Figure 6:
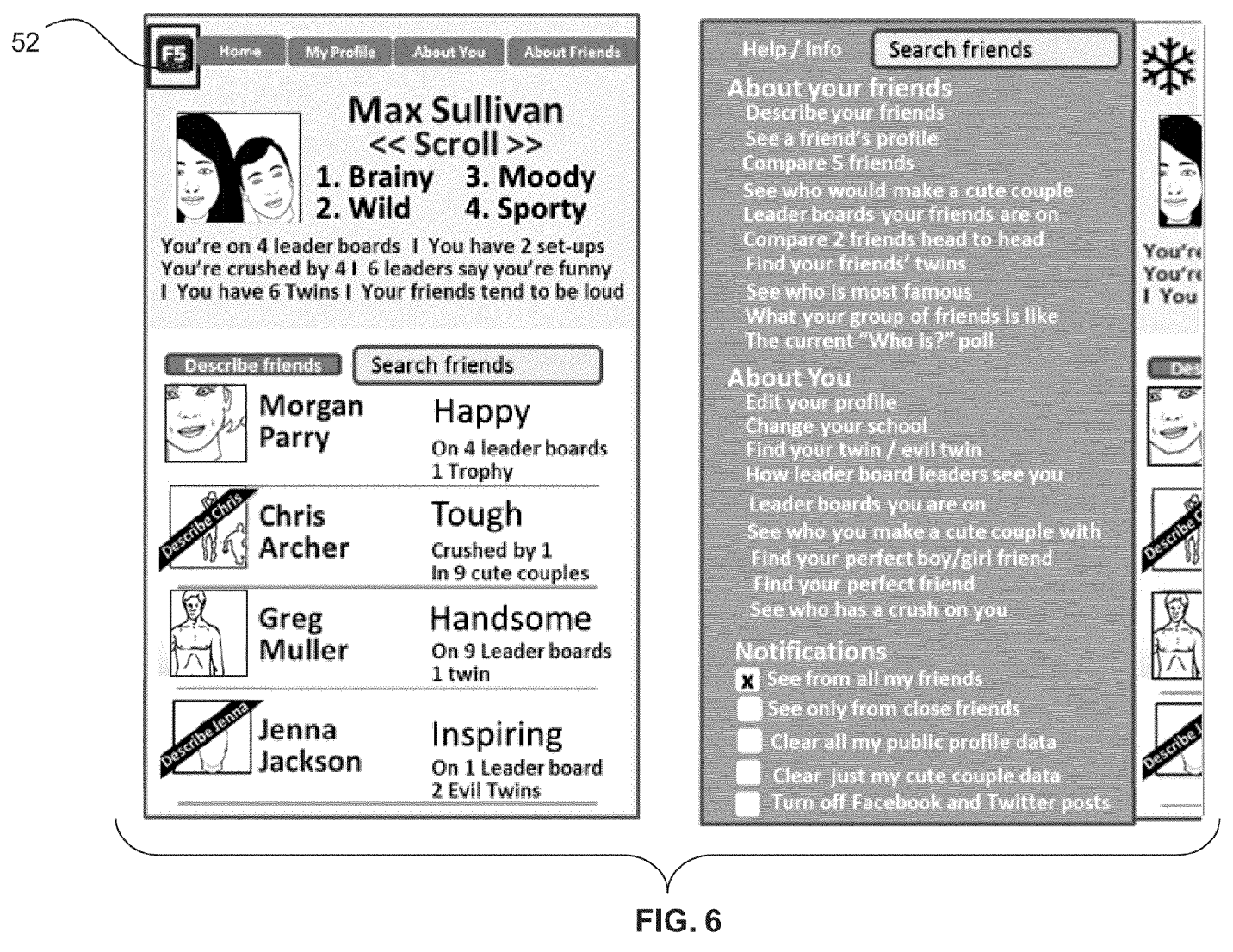

The app button 52 makes the screen the user is on slide to the right as shown in FIG. 6. The app screen contains master navigation, settings, and payment trailheads. Pushing the app button 52 again brings the user's homepage back.

Figure 7:
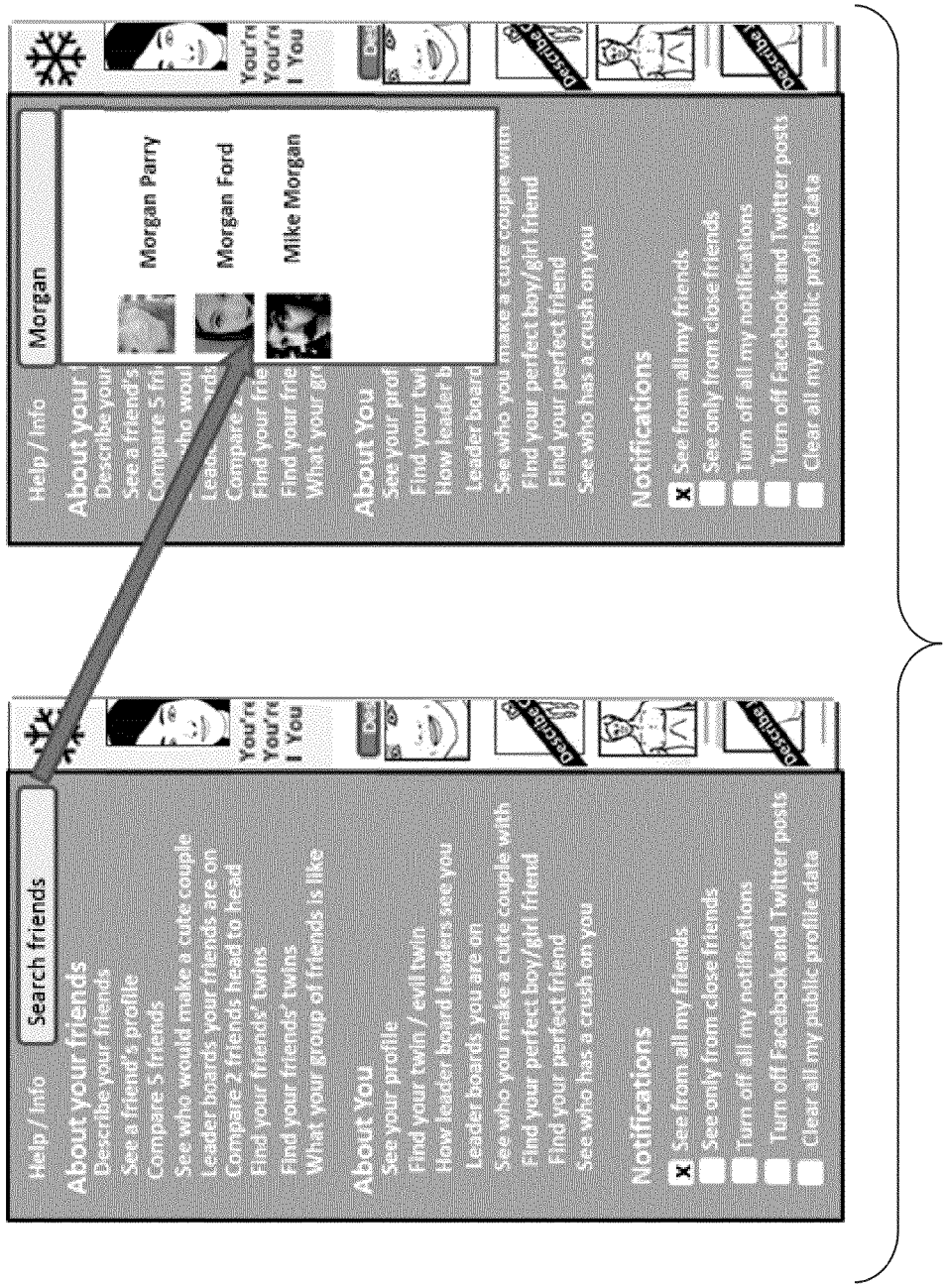
FIG. 7 is a screenshot of search results screen

As shown in FIG. 7, users can search for their friends. The search functions is like the Facebook® mobile search with the results listed below. Touching the name or photo takes users to that friend's profile screen.

Figure 8:
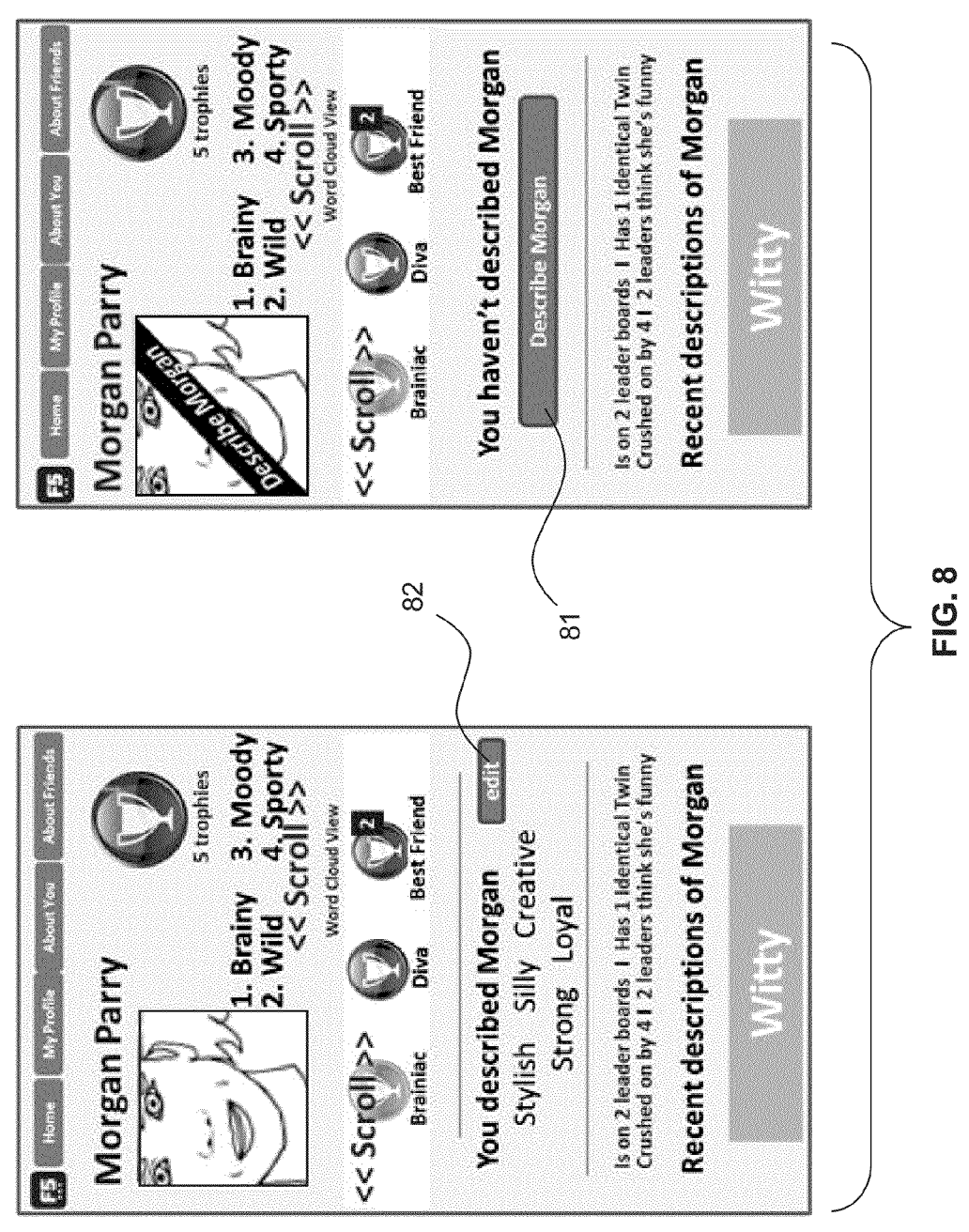

As described earlier, the system and method of the app allows users to describe their friends. Referring to FIG. 8 there is disclosed a description page for users to describe their friends. The one on the right shows a friend's profile whom the user hasn't described. A click of "Describe xxx" button 81 leads to friend description screen (see FIG. 9). The one on the left side shows a friend's profile that the user has already described. The user is allowed to edit their description about the friend. A click of the "edit" button 82 leads to friend description screen (see FIG. 9). In friend's profile, the user can view a lot of information about that friend.

The system also has method for identifying duplicate profiles for the same person. The user may have their friend Amy Saxton listed as "Amy Saxton" on Facebook® and "A Saxton" in their contact list. How will the app know they are the same person?

Behind the scenes the app checks each friend in the user's phone contact list who has also downloaded the app. It collects each friend's device's unique ID number (UDID, Subscriber Identity Module or Android ID) and the name of the owner of each phone.

It then accesses the user's friends on Facebook®. If the name on the phone matches the name of a Facebook® friend, the app merges the two names into one name and one account, linking the Facebook® name to the ID of the phone. The Facebook® name will be the default name of the account, not the name on the contact list.

Once the names are merged into one profile the user no longer see separate profiles for the friend. No one else can see duplicate accounts either because that phone ID and the Facebook® account have been merged.

Figure 9:
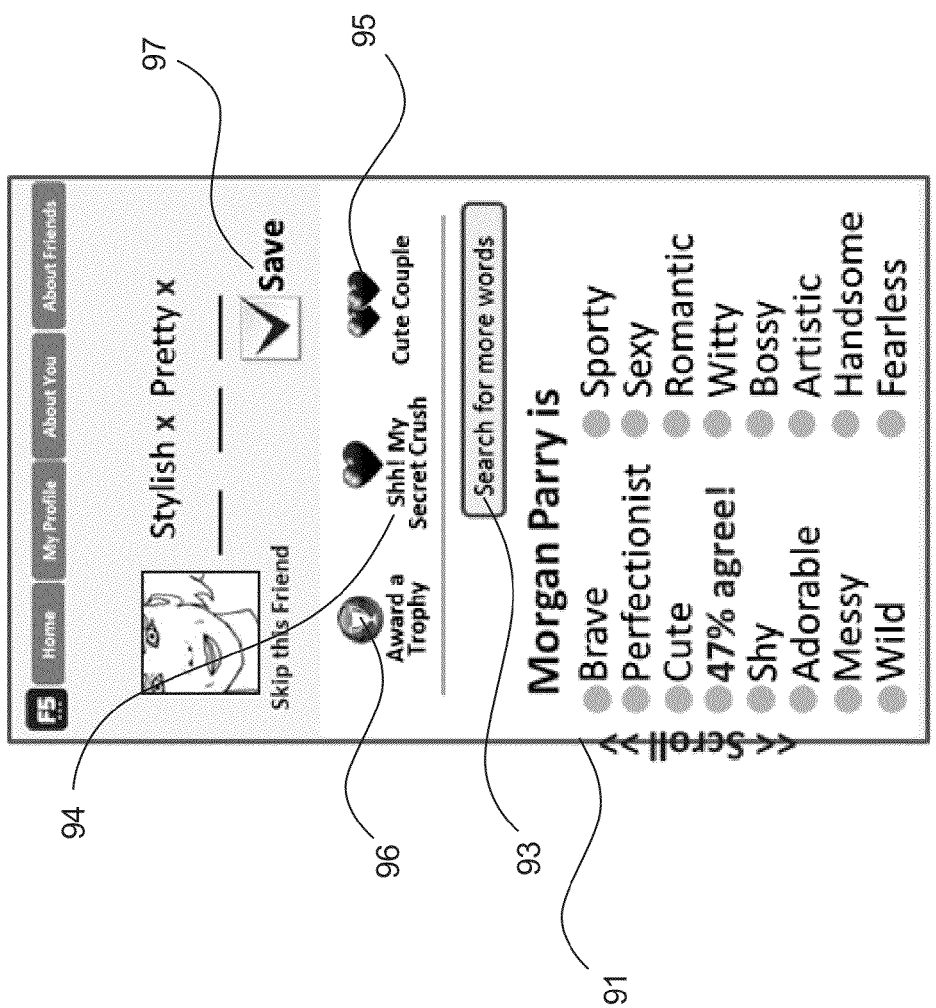
FIG. 9 is a screenshot of friend description screen showing description process includes leaking bits of content after descriptions.

Referring to FIG. 9 there is disclosed a friend description screen where users can describe their friends by selecting words from a list provided by the system (app). Words 91 are listed at random from a list of about 100. Selecting a word adds it to the top screen to replace blank lines. The user can select up to 5 words per person. When the user select a word it tells the user what percent of everyone else who profiled Morgan also picked that word. In this example, 47% agree! The search box 93 links to 100's of words not on the list below it. It auto fills words. It works like the Facebook® app search box so as soon as the user touches inside of it, the screen clears below for auto-fill results as the user types.

The icon in a heart shape 94 adds the person as a crush. A confirm pops up that says "This person is the user's secret crush. No one else will ever know!" The user cannot see or edit the user's list of crush selections—it's permanent.

Figure 10:
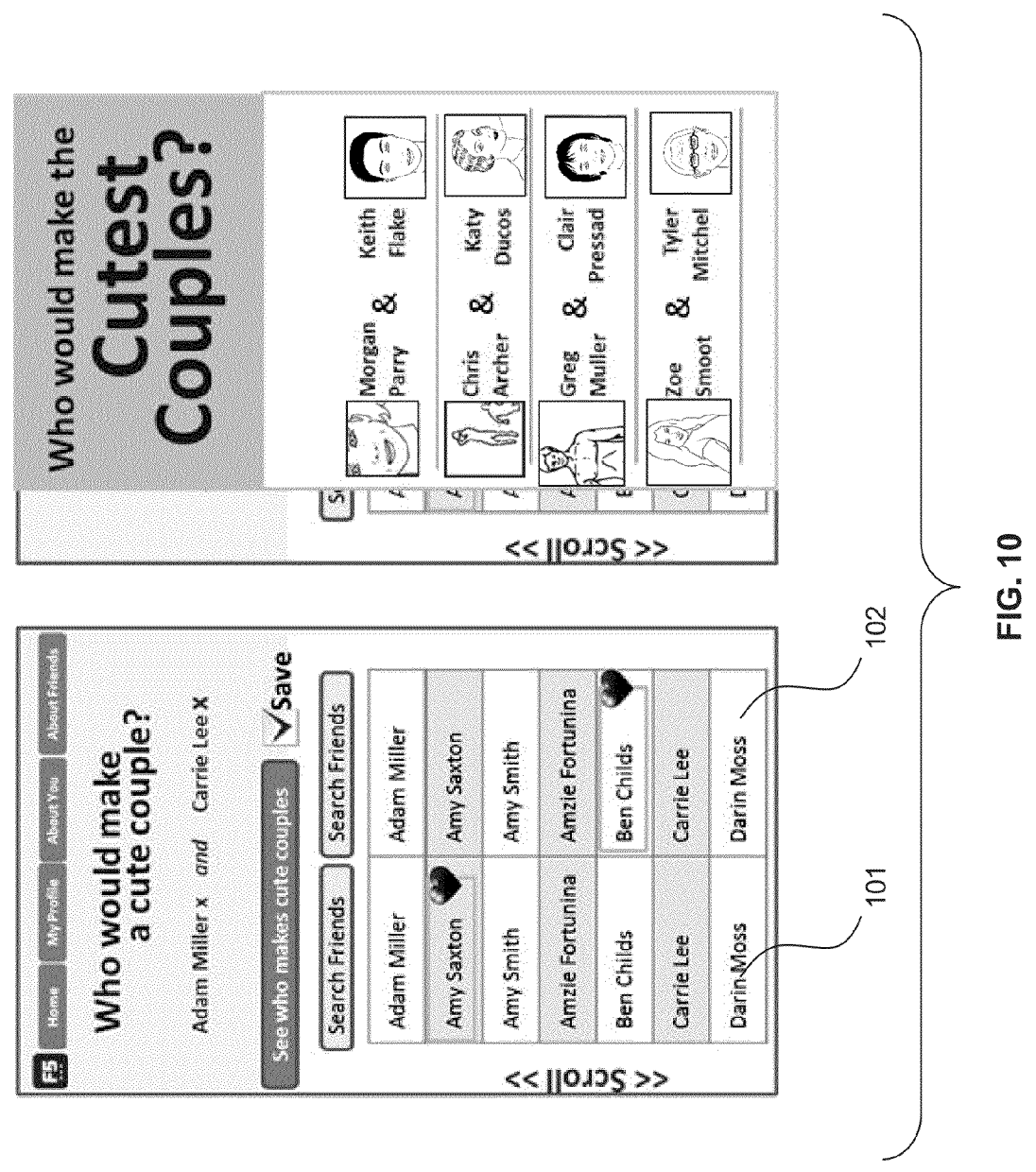

Clicking on the icon in a shape of two overlapping hearts 95 opens the cute couple selection screen (FIG. 10). Clicking on the icon of a trophy 96 opens the trophy selection screen (FIG. 11).

FIG. 10 shows a screen for cute couple matching on the left side and the cute couple ranking on the right side. Alphabetical list of all friends in the group duplicated on the left and right side columns 101, 102 which can be scrolled independently. User can match anyone from the left with anyone from the right but they cannot be matched by themselves. If the user accesses this page from a friend's profile page, that friend is already listed as one half of the couple. FIG. 10 also shows a screen of the cute couple ranking on the right side. A ranking of the most commonly suggested couples are listed. To be listed, at least one half of the couple should be a first- or second-degree friend.

Figure 11:
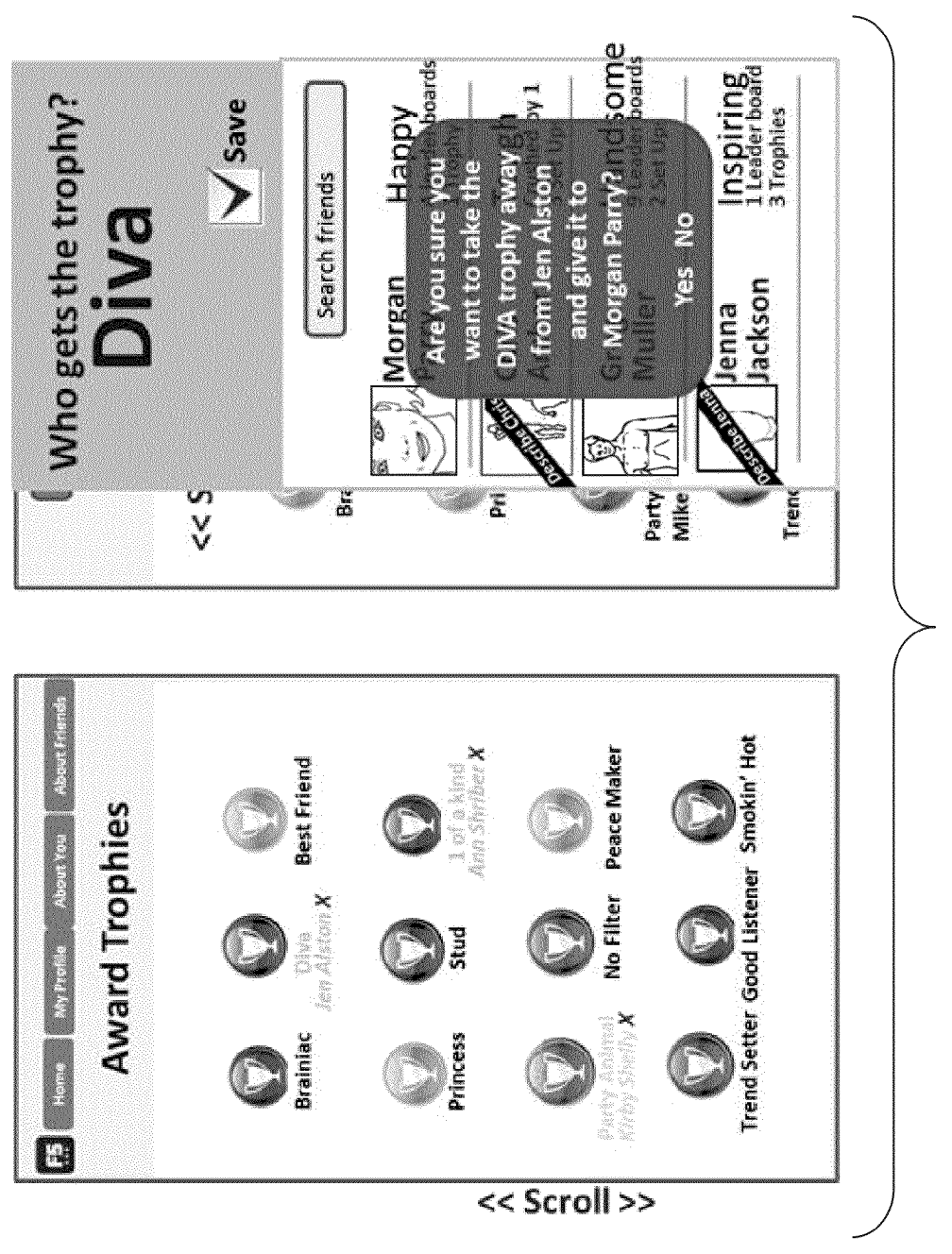

FIG. 11 shows two screen shots of award trophies screen. Screen 1 displays a variety of trophies and allows users to select a trophy. Each Trophy should look different. A sparkle animation would look nice. Awarded trophies are grayed out. A user touches one trophy and a cover screen (screen 2) moves in from the right so the user can select who to award the trophy to. If the user has already awarded a trophy to someone their name appears below with a red X to take it away. The user can only give a trophy to one person at a time. A notification goes out to the friend when the user awards or takes back a trophy. If a user came from here by clicking "award a trophy" on a friend's profile, that person is already loaded to receive the trophy the user picks.

Referring back to FIG. 9, every time the user clicks "save" 97, a notification goes out to the friend the user just described. It also opens the friend description screen for another friend the user needs to describe. When the user describes someone, the app advances the user to the next friend. On this new friend description screen it rewards the user by telling the user how well the user knows the person from the previous screen based on:

Really well: 3+ of the user's words were also picked by the person;
Sort of: 1-2 of the user's words were also picked by the person;
Not well: 0 words were picked the person and 3+ of the user's words were not picked by anyone else.

Figure 12:
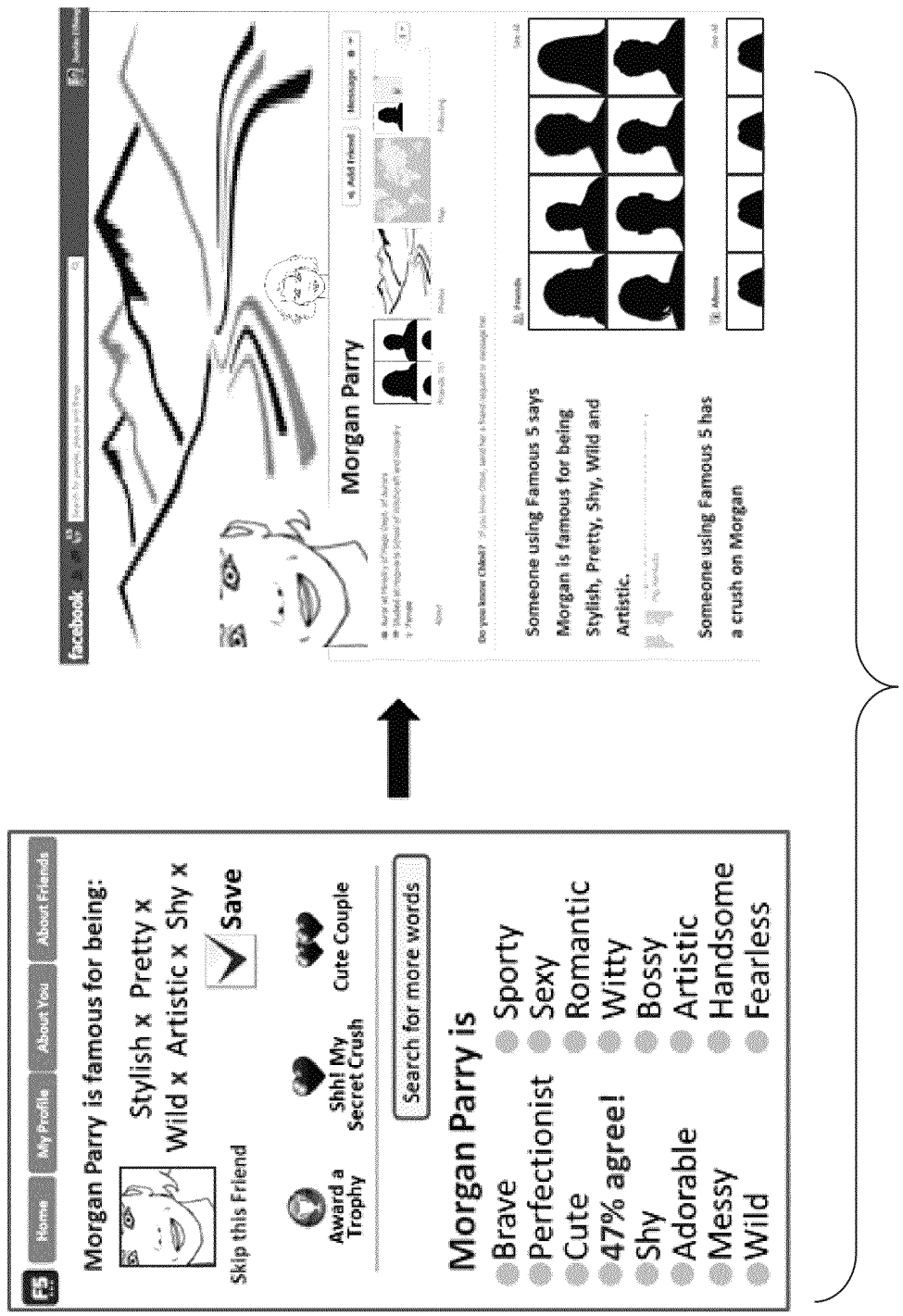
FIG. 12 shows a friend's description screenshot and facebook page
Figure 13:
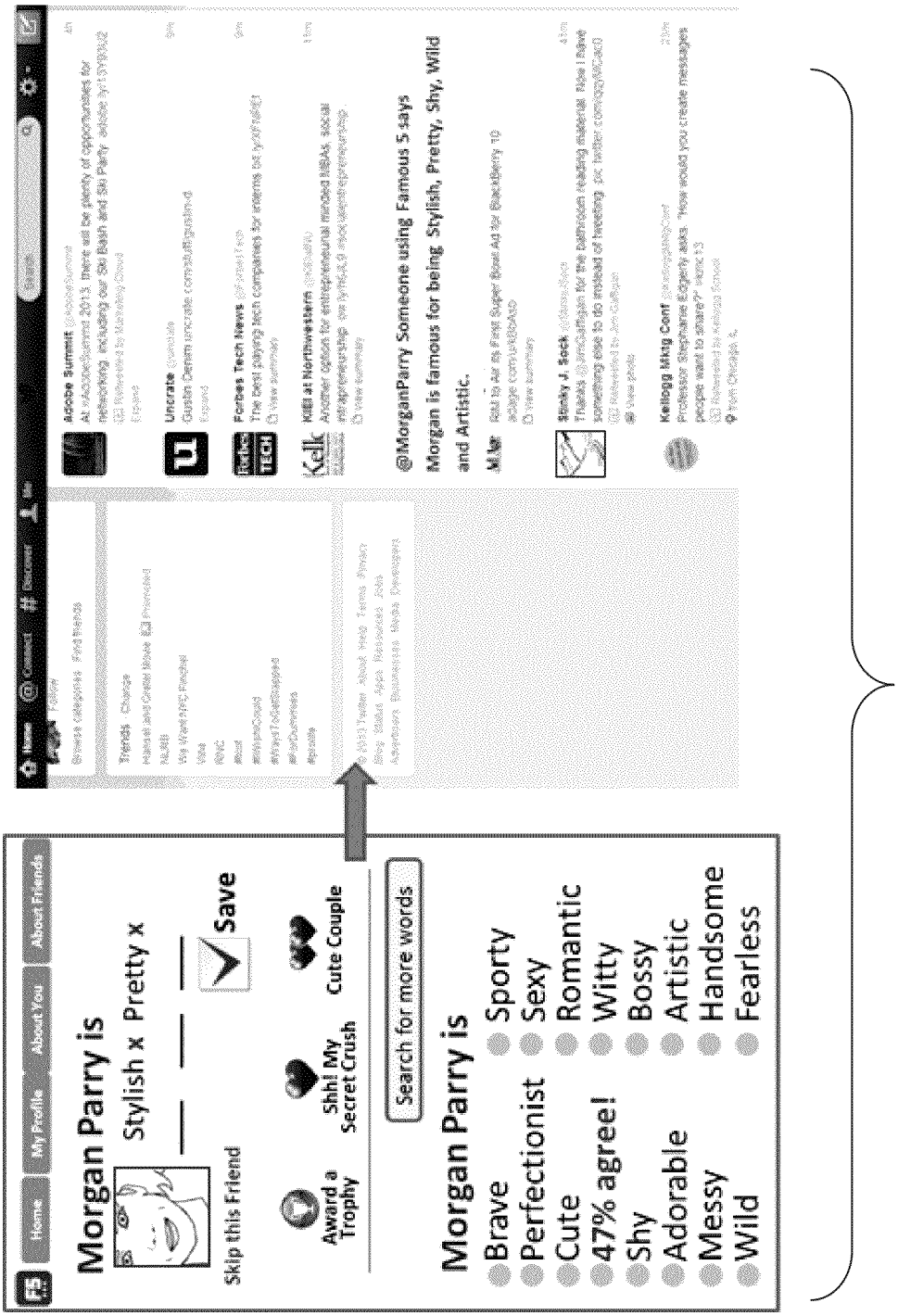
FIG. 13 shows a friend's description screenshot and twitter feed

As demonstrated in FIGS. 12 and 13, when a user describes a friend, the user's anonymous description shows up on that friend's Facebook® page and the news feed of her friends or is tweeted to her and her followers. Using Morgan as an example, if Morgan appears or moves on a leader board it also posts to Facebook® or it's tweeted to her and her followers. If Morgan gets a trophy it appears on Facebook® or it's tweeted to her and her followers. Also if people have crushes on her, these posts link to a way to download the app or these tweets come from the Famous 5 Twitter account.

The system and method of the app continues to generate reports about all users and their friends in the group (also users of the app).

Figure 14:
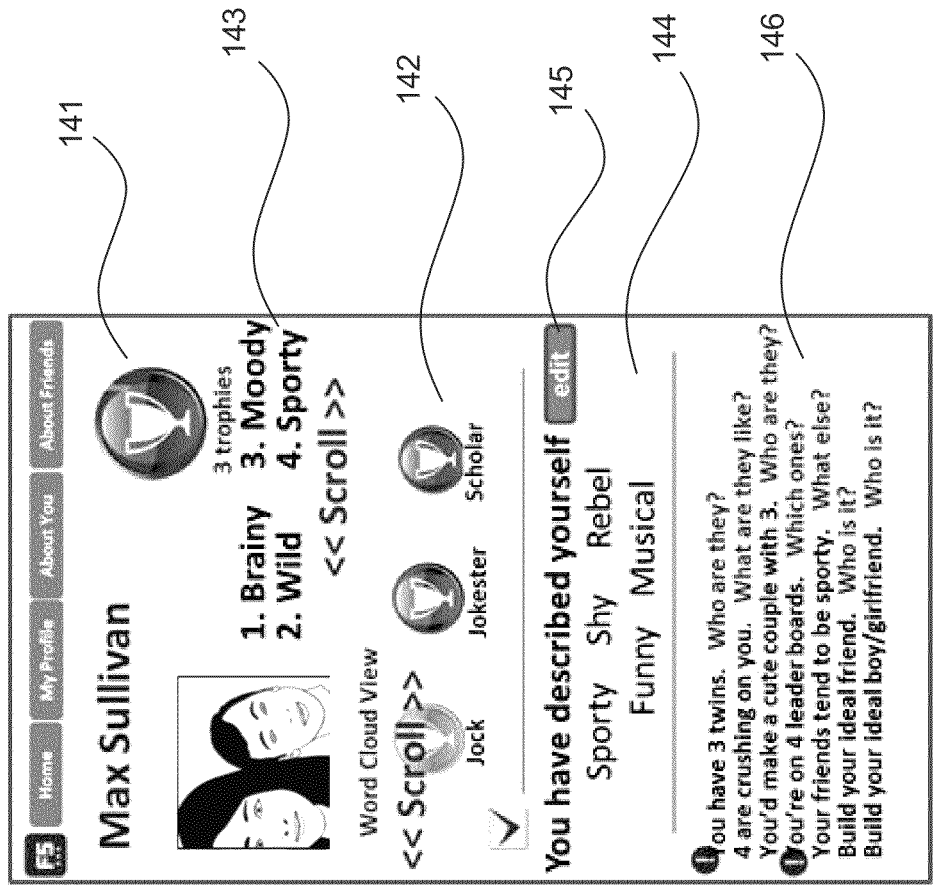
FIG. 14 shows user's report-profile including database queries show the user's description and filters allowing users to see description from various groups.

Most importantly, users can see their own profiles that show users how people see them and what they are famous for. Referring to FIG. 14 there is disclosed a user's report-profile view. The profile view shows how many trophies 141 and what trophies 142 a user gets. The words used to describe the user 143 in an order ranked by frequency. The user's self description will also be shown 144 and can be edited by clicking the "edit" button 145. In the bottom of the profile view shows quick stats 146 which are the same as shown in the home page and is refreshed every 15 minutes. The user can edit 144 the words he/she describes themselves.

Figure 15:
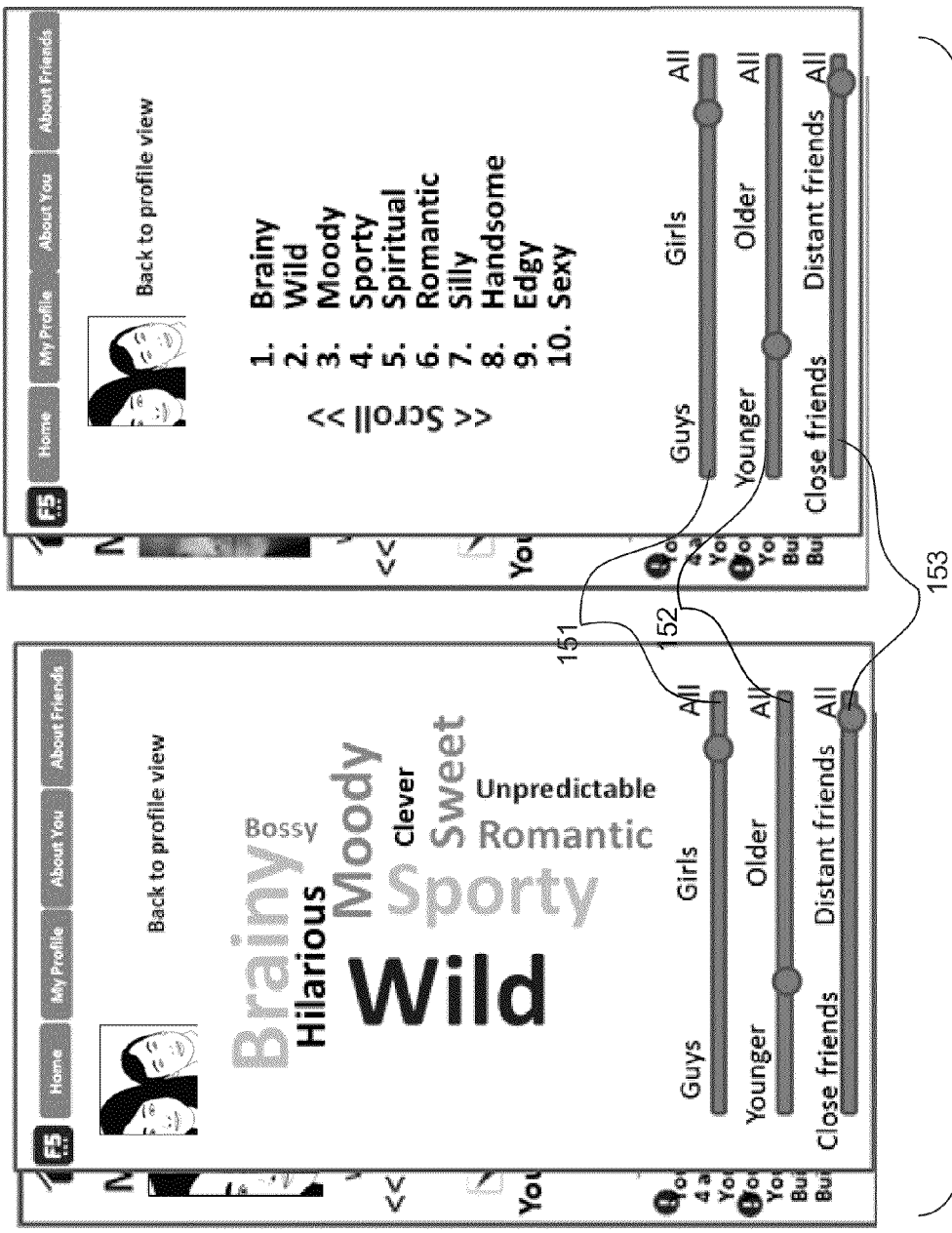
FIG. 15 shows user's report-word cloud screen and all words screen

As shown in FIG. 15, the user's report can show either word cloud screen (on the left) or all words screen (a list in order, on the right). World cloud is based on frequency of words selected. The words with the bigger font size means it was selected more frequently by friends to describe the user. The user can change the results of the cloud by filtering results just from males, just from females, or everyone. The gender scale is indicated by 151. The words grow or shrink as the slider is moved. The user can change the results of the cloud by selecting results from older or younger users. The word cloud words grow or shrink as the slider is moved. This age scale 152 takes the age of the youngest person to describe the user and pins that as the low. It takes the oldest person to describe the user and pins them as the high. The result can be changed by the closeness of friends by moving the slider along the friends bar 153. Close friends are the first-degree friends. Distant is the second-degree friends. All is third-degree friends. The all words screen shows a ranked list of all words used to describe the user in order of frequency. The user can filter it with the sliders 151, 152, 153.

The system and method of the app analyzes the information collected from the group and generates a series of reports including trophy leaders, cute couple, twin spotter, crush report, clique report, fame rank, etc.

The user can also request the system to build a crush, a best friend for them. Also, the user can ask the system to compare people including himself/herself.

Figure 16:
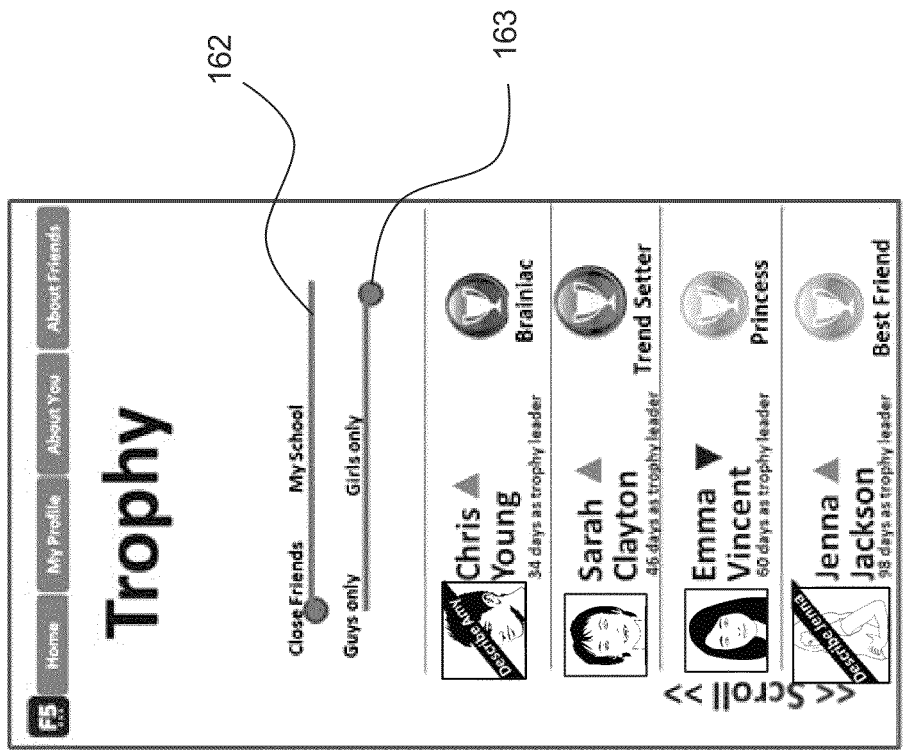
FIG. 16 shows trophy leader screenshot

Referring to FIG. 16 there is disclosed a screenshot showing which friends have received the most of each trophy 161. It does not reveal how many trophies they have. The slider 162 lets the user see results among just the first-degree friends, just people in user's school, or user entire group. The slider 163 lets the user see the results with just boys, just girls or everyone.

Figure 17:
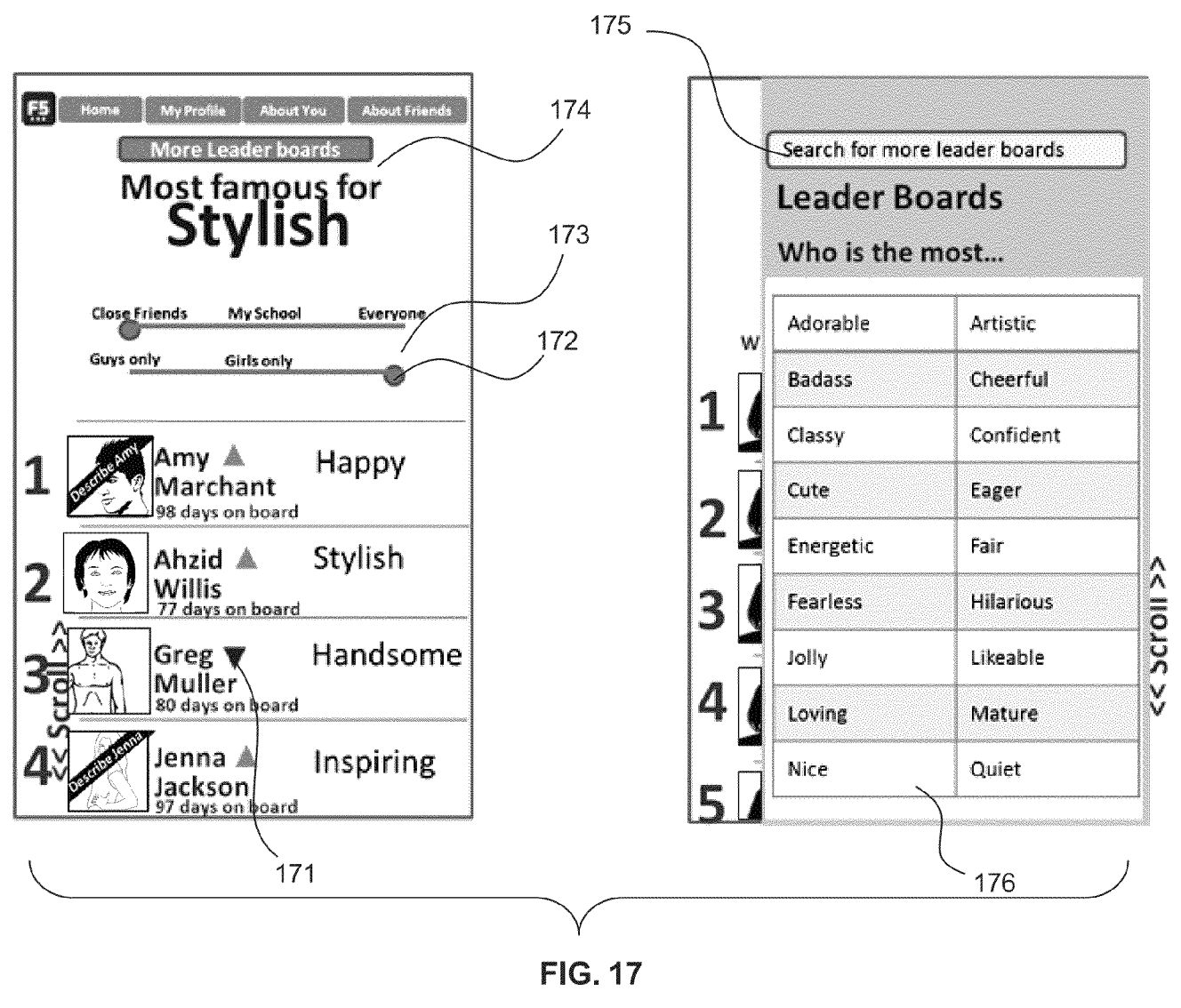

FIG. 17 shows screenshots of leader boards (on the left) which lists friends in rank order of how many times they have been described as "stylish" or any other word. The board ranks the top 25 in user group out to $3^{rd}$ degree friends. Arrows 171 shows board movement in the past 3 days. The toggle button 172 shows the user only the top 25 guys, or girls who have the most frequent % mentions of "stylish". (For example: 75% of those who described them said they are stylish). Toggle button 173 shows ranking of user's whole group, people at user's school, or just user's first-degree friends. By clicking "more leader boards" 174 brings a page cover on the right with a list of the words (alphabetical) plus a search box for more 175. A click of a word 176 brings up that leader board screen on the left.

Figure 18:
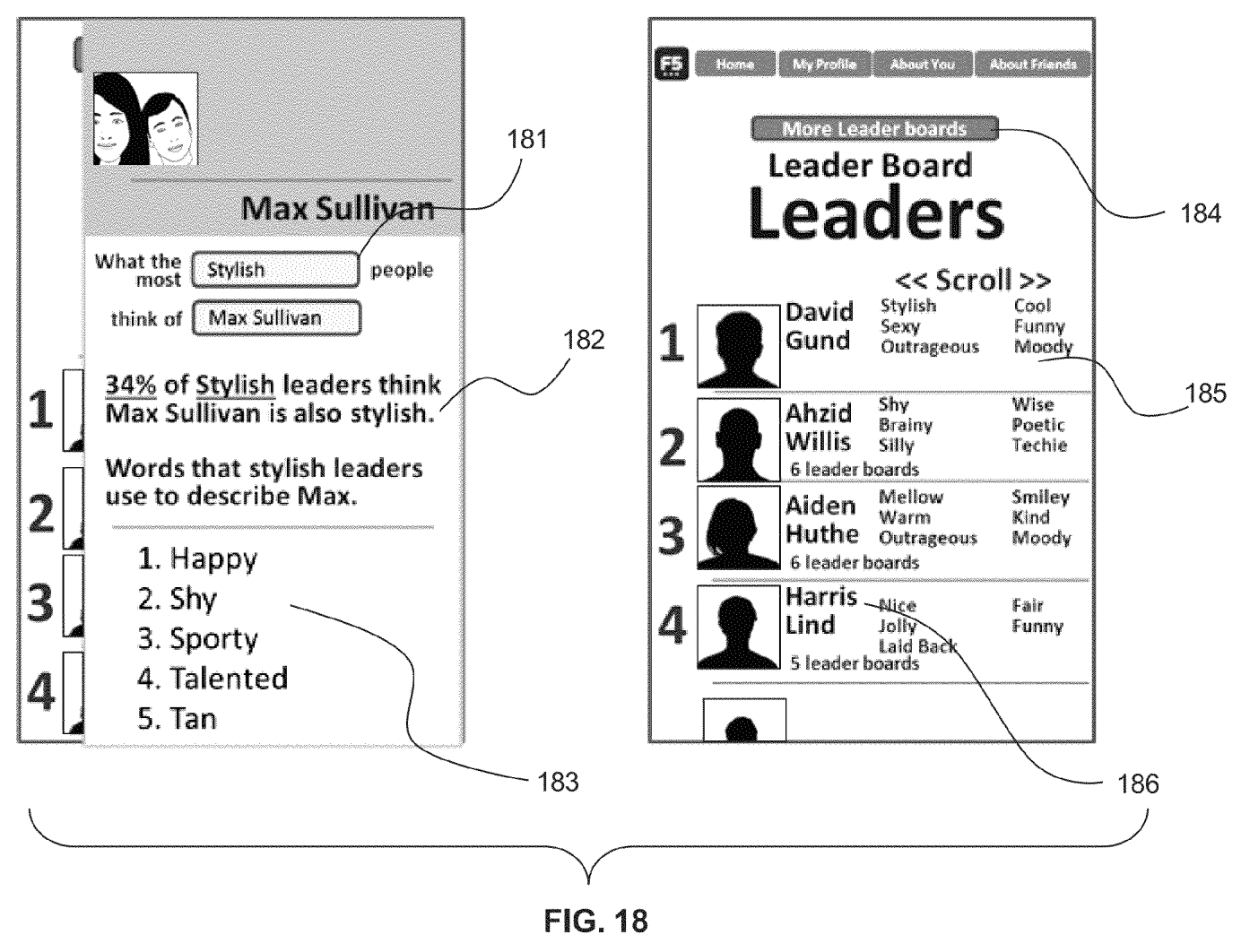

More reports related to leader boards are shown in FIG. 18. In the guru report (shown in the left side of the figure), the two-step 181 search lets the user see how leaders on X leader board think about them or any friend. The search shows how many % of leaders on this board who described the user with the same word 182. For example, 34% of Stylish leaders think Max Sullivan is also stylish. It also shows a list of most frequent 5 words that the 30 leaders on this board use to describe the user 183.

A mega leader board (on the right side) ranks who appears on the most leader boards and which boards they are on. The user can see more leader boards by clicking "more leader boards" button 184. Clicking a word 185 sends the user to that leader board. Clicking a name 186 sends the user to that person's profile screen.

Figure 19:
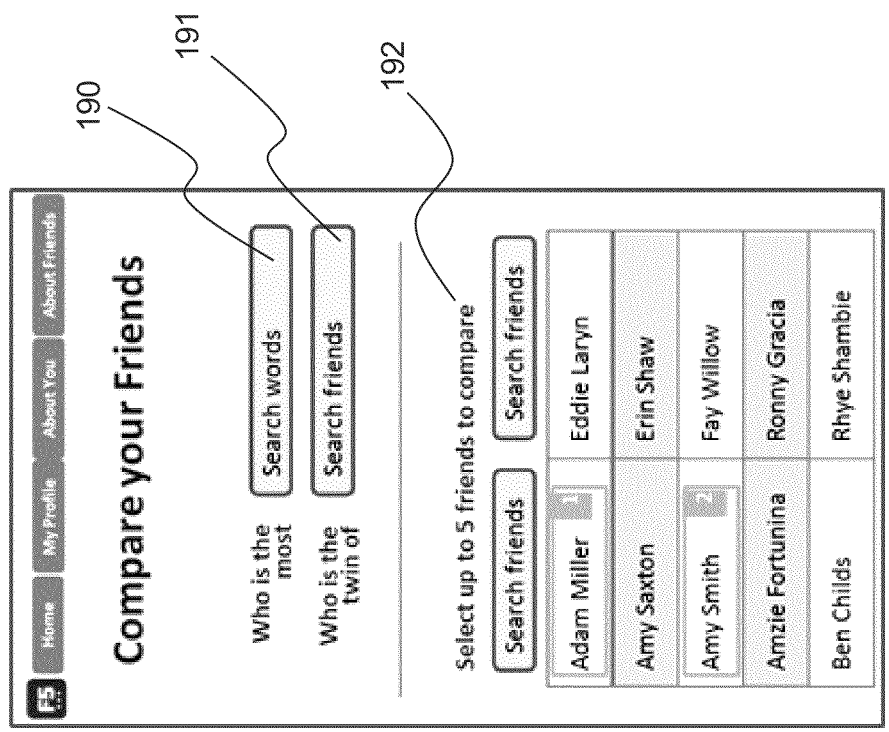
FIG. 19 shows the Compare 5 Report screen 1.

FIG. 19 shows the Compare 5 Report screen 1. On the Compare 5 Report screen 1 it asks "Who is the most" followed by a search box 190 that allows the user to input words so the user can see which friend is most associated to the inputted word. On the screen, the user can also search to see who is the twin of a friend of their choice. The friend's name can be entered into the search box 191 after the phrase "Who is the twin of".

Finally the page allows the user to select up to 5 friends to compare 192. The user can select (and deselect) friends by touching their names. A number appears 1-5 on their name to tell the user how many friends the user has selected. User's own name can be included.

Figure 20:
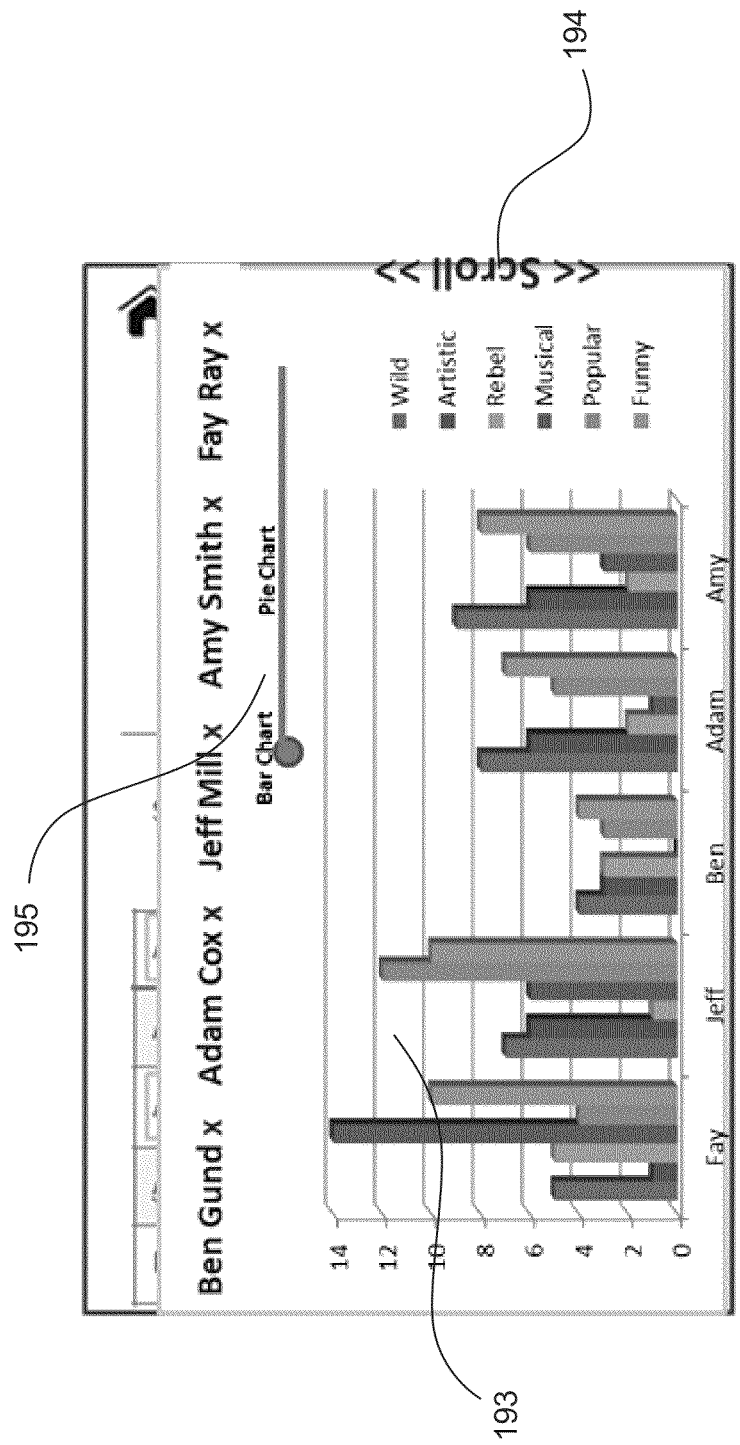
FIG. 20 shows the Compare 5 Report screen 2.

FIG. 20 shows the Compare 5 Report screen 2. After selecting the five people to compare, a cover screen appears over screen 1. A bar chart 193 shows how the 5 friends compare to each other.

This chart 193 pulls data based on frequency of words. It selects the words to chart in order of top used words for all 5 or 6 words per chart. Users can scroll the charts down to see the next 5 words charted 194. A bar slider 195 can allow user to toggle between chart types.

Figure 21:
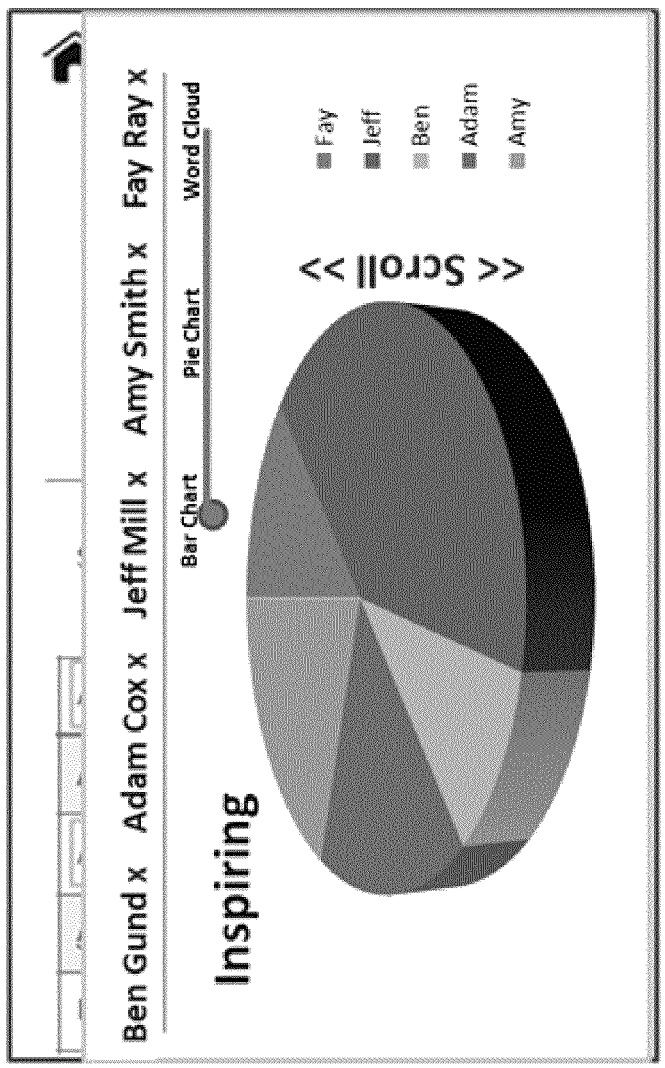
FIG. 21 shows a pie chart of the results of compare 5.
Figure 22:
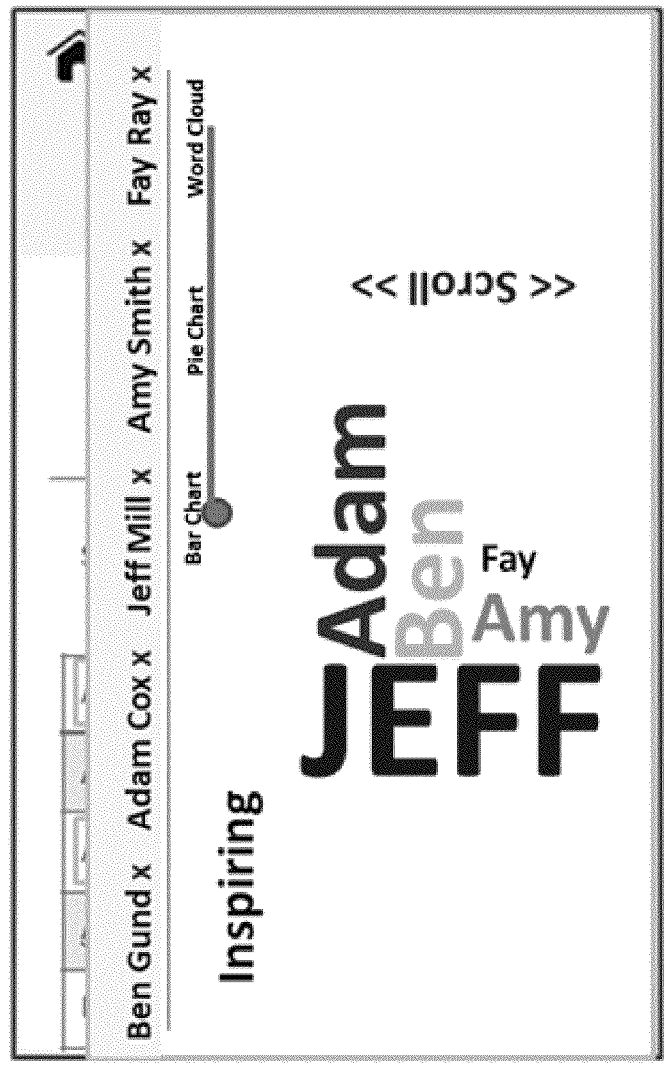
FIG. 22 shows a word cloud of the results of compare 5.

FIG. 21 shows a pie chart of the results of compare 5. Users can scroll the charts down to see the other word charted in pie charts. FIG. 22 shows a word cloud of compare 5. Word clouds show the names of the 5 friends. Larger names mean higher frequency for the listed word. Users can scroll the word clouds down to see the other words charted in clouds.

Figure 23:

FIG. 23 shows another compare 5 report where the 5 compared names are listed on the top of the page. Each name has an x symbol that can be clicked to remove the name. On the page it lists what each person is most of. For example, "Ben is the most rebel and stylish", "Jeff is the most creative", etc.

User can scroll the page up and down to view the full report.

Figure 24:
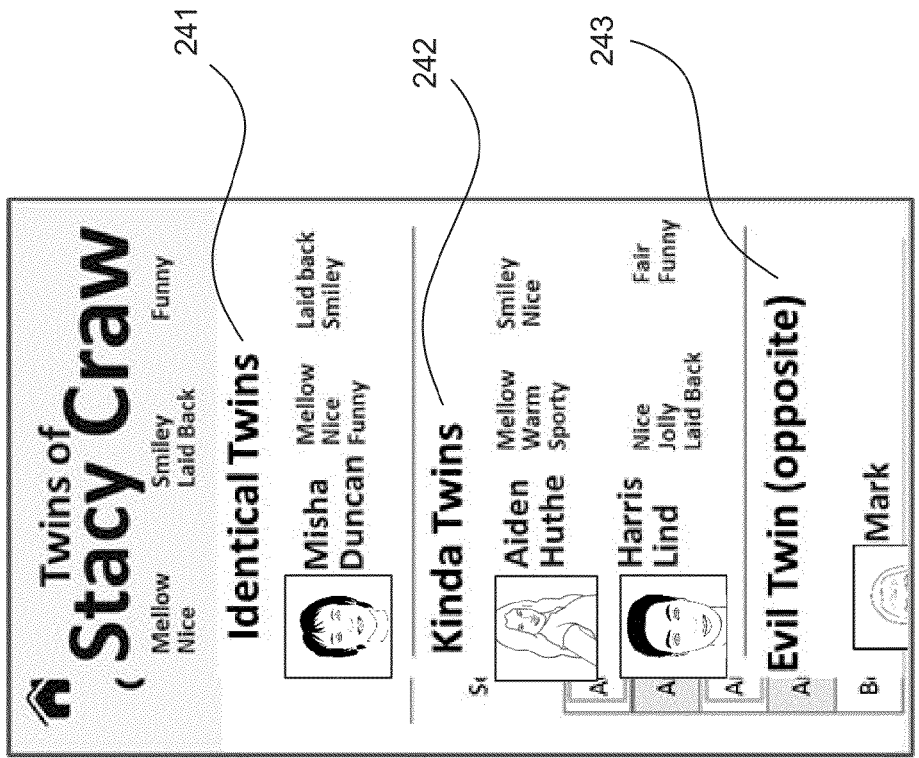
FIG. 24 shows another compare 5 report which shows the results of the twins of the friend the user searched for or the user themselves.

FIG. 24 shows another compare 5 report which shows the results of the twins of the friend the user searched for. In this case, Stacy Craws, the name the user entered in the search box 191. In this screen, the identical twin 241 of Stacy Craw is displayed. An identical twin is anyone in the group who has the same top 5 word descriptions. The Kinda twin 242 is also displayed. Kinda Twin is anyone in the group who has at least 3 of the 5 same top word descriptions. Finally the evil twin (opposite) 243 is displayed. Evil Twin is anyone in the group who has at least 3 opposite words. The system will pair each word with its opposite in the database. For example: wild vs. serious, hyper vs. mellow, anxious vs. serene, grumpy vs. happy, optimistic vs. pessimistic, impulsive vs. careful, etc.

Figure 25:
FIG. 25 shows the twin spotter screen.

Alternatively, user can pick a friend by entering their name into the search friend box 251 and see their twins using the Twin spotter screen as shown in FIG. 25. A twin spotter results (cover) is the same as the results of the compare 5 report screen for twin search (FIG. 24).

Figure 26:
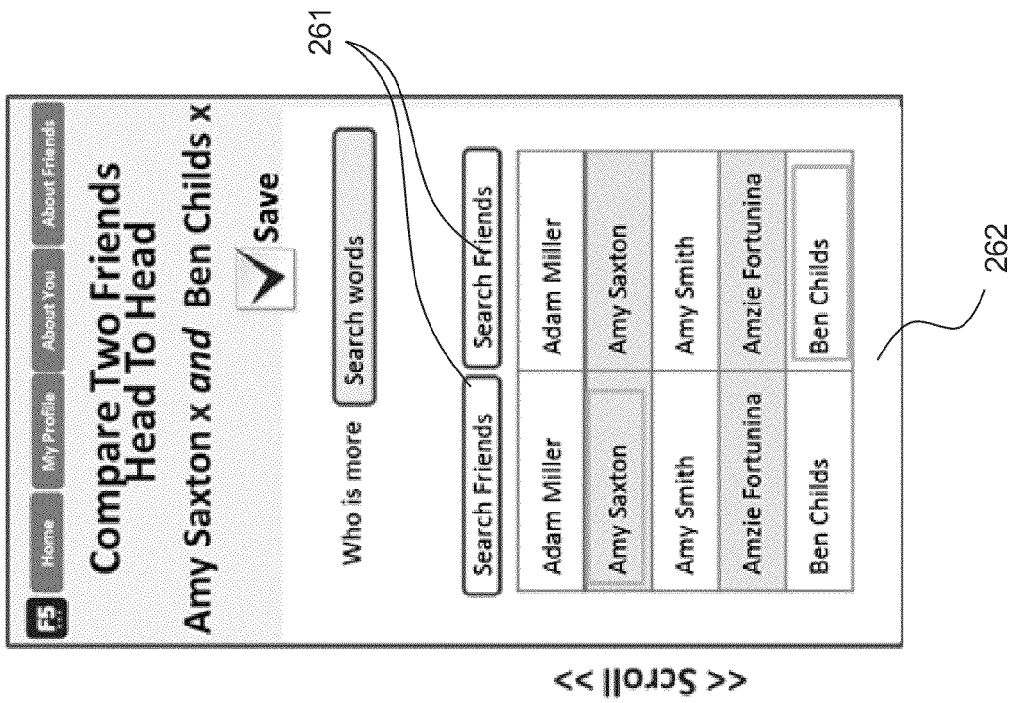
FIG. 26 shows the Compare Two Friends Head to Head screen 1.

FIG. 26 shows the Compare Two Friends Head to Head screen. The screen contains search box 261 to search friends to compare. The two columns 262 scroll independently. The search name will become one of the names on the bottom ten name boxes. User highlights by clicking and selecting the two friend's name to compare. Each name selected is also displayed on the top of the screen. By each name is a red x symbol that can be clicked on to remove the name.

Figure 27:
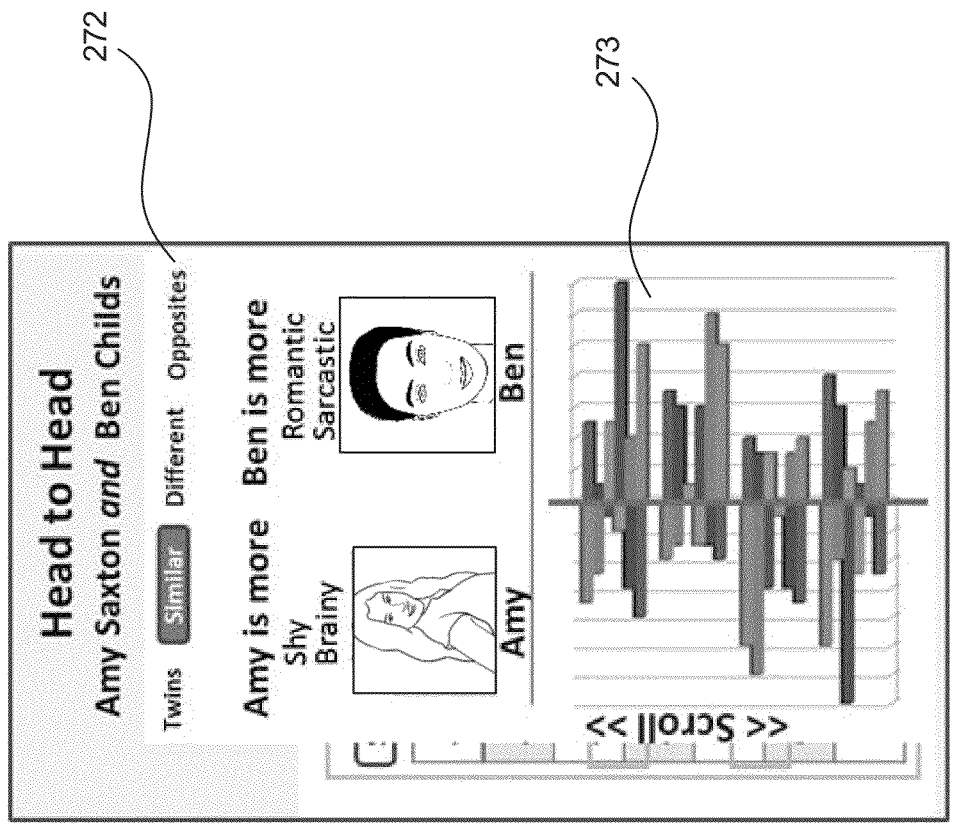
FIG. 27 is the Head to Head Report Screen 2, page will pop up as a cover over head to head report screen 1.

FIG. 27 is the Head to Head Report Screen page which will pop up as a cover over the head to head report screen 1. On the top it displays "twins, similar, different, and opposites 272. If the two share 10+ words: Twins will be highlighted. If the two share 3-10 words: Similar will be highlighted. If the two share 1-2 words: Different will be highlighted. If the two share 0 words and any opposite words: Opposites will be highlighted.

The top two or three words for which one friend has the biggest advantage over the other will be displayed. For example, Amy is more shy, brainy. Ben is more romantic, sarcastic. And on the bottom is a bar graph. Each horizontal column 273 represents 1 word. It is the % of people who used to describe that person. Longer bar means higher percent.

Figure 28:
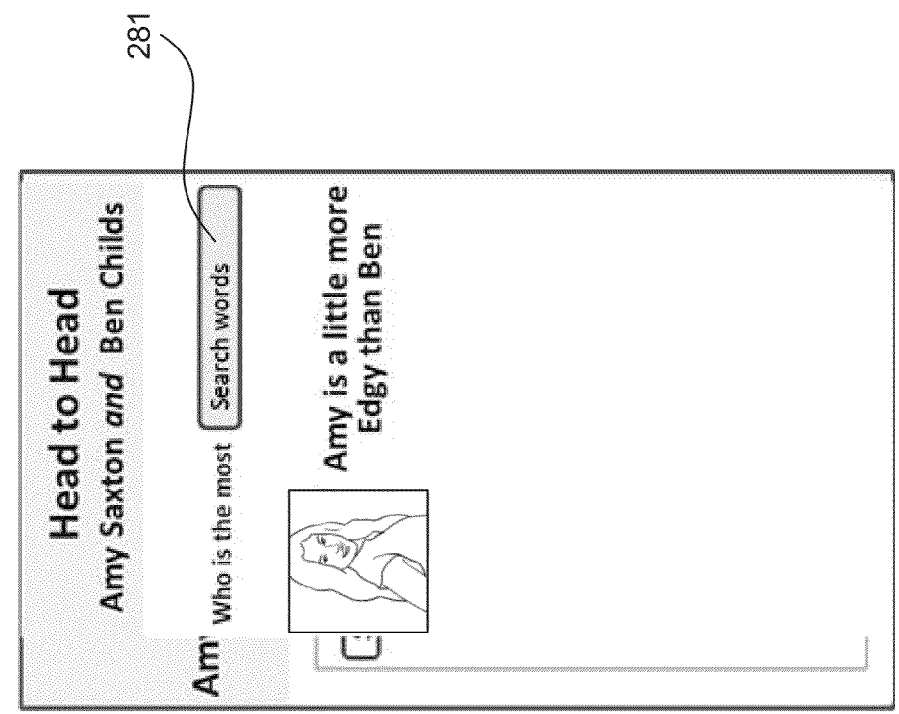
FIG. 28 shows the head to head report screen (cover).

FIG. 28 shows the head to head report screen (cover). This cover screen says which of the two has more frequent mentions for the word entered into the box 281 by the user. If the % of one person is much greater than the other person the screen tells the user "is a lot more". If the % difference is small it tells the user "a little more". If there are 0 mentions of that word for either friend it says "Neither Amy nor Ben are artistic". Controversial words such as "sexy" "popular" "cool" etc. "Amy is a lot more sexy than Chloe" may be disabled.

Figure 29:
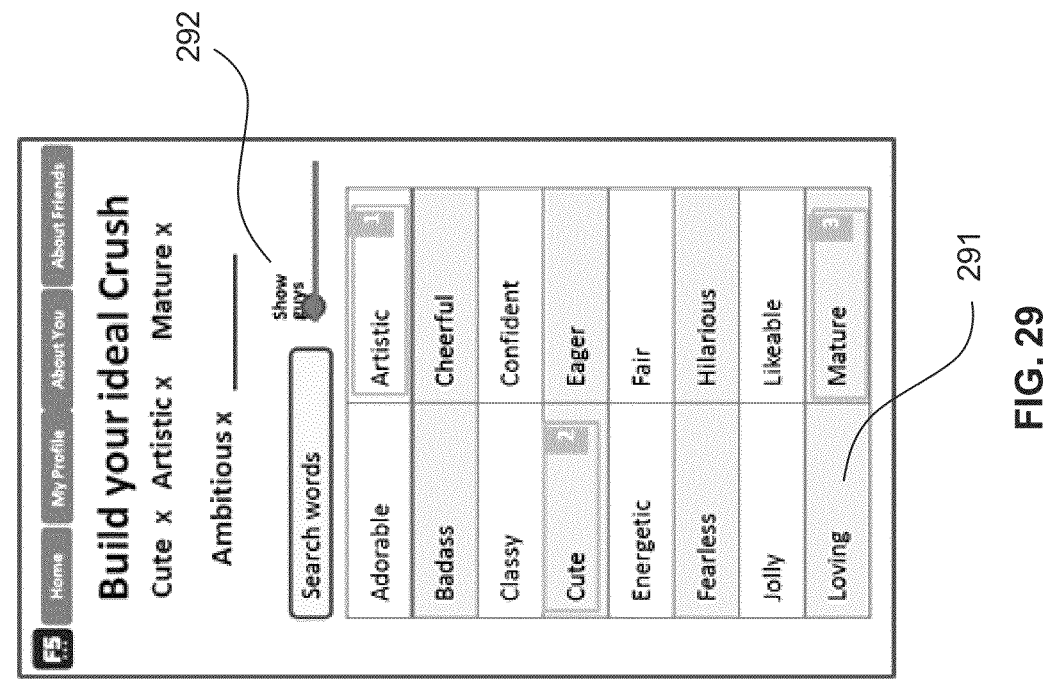

FIG. 29 shows the build a crush screen 1. On the screen a list of words are listed. User can click to select the 5 words in the column 291 best describing the ideal crush. Every word clicked will be highlighted and given a number 1-5 based on order clicked, 1 being the most important word and 5 being the least important word. User may enter words in the search words box to put new word in the word list so it can be selected by the user. Every word selected will also be displayed on the top of the page. Each word has the symbol x next to it that can be clicked on to remove the word. There is also a slider that allows the user to show only guys or only girls.

Figure 30:
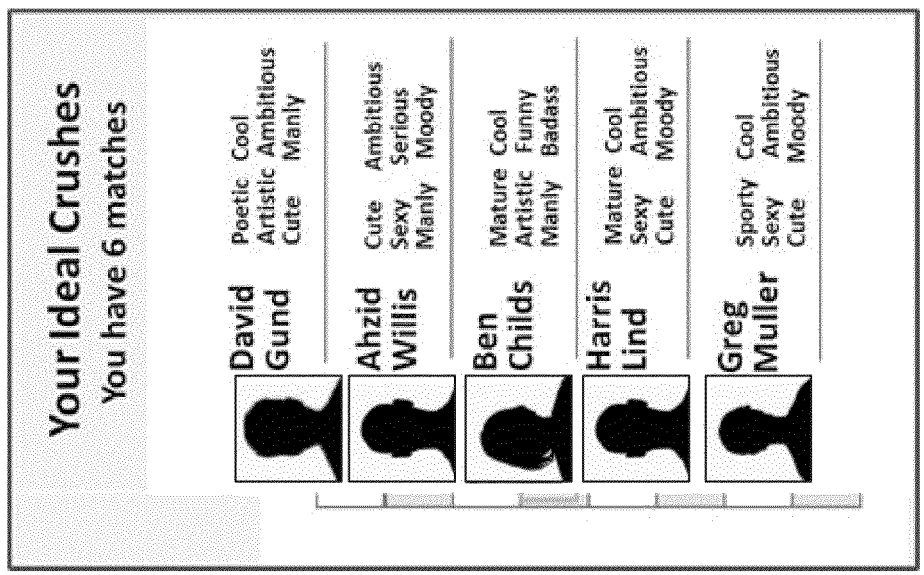
FIG. 30 shows the build a crush screen 2 (cover).

FIG. 30 shows the build a crush screen 2 (cover). This cover screen shows the ranking of all the guys or girls (based on the slider 292) whose top 5 words most closely match the 5 words selected. It does not list people with less than 2 matching words.

Figure 31:
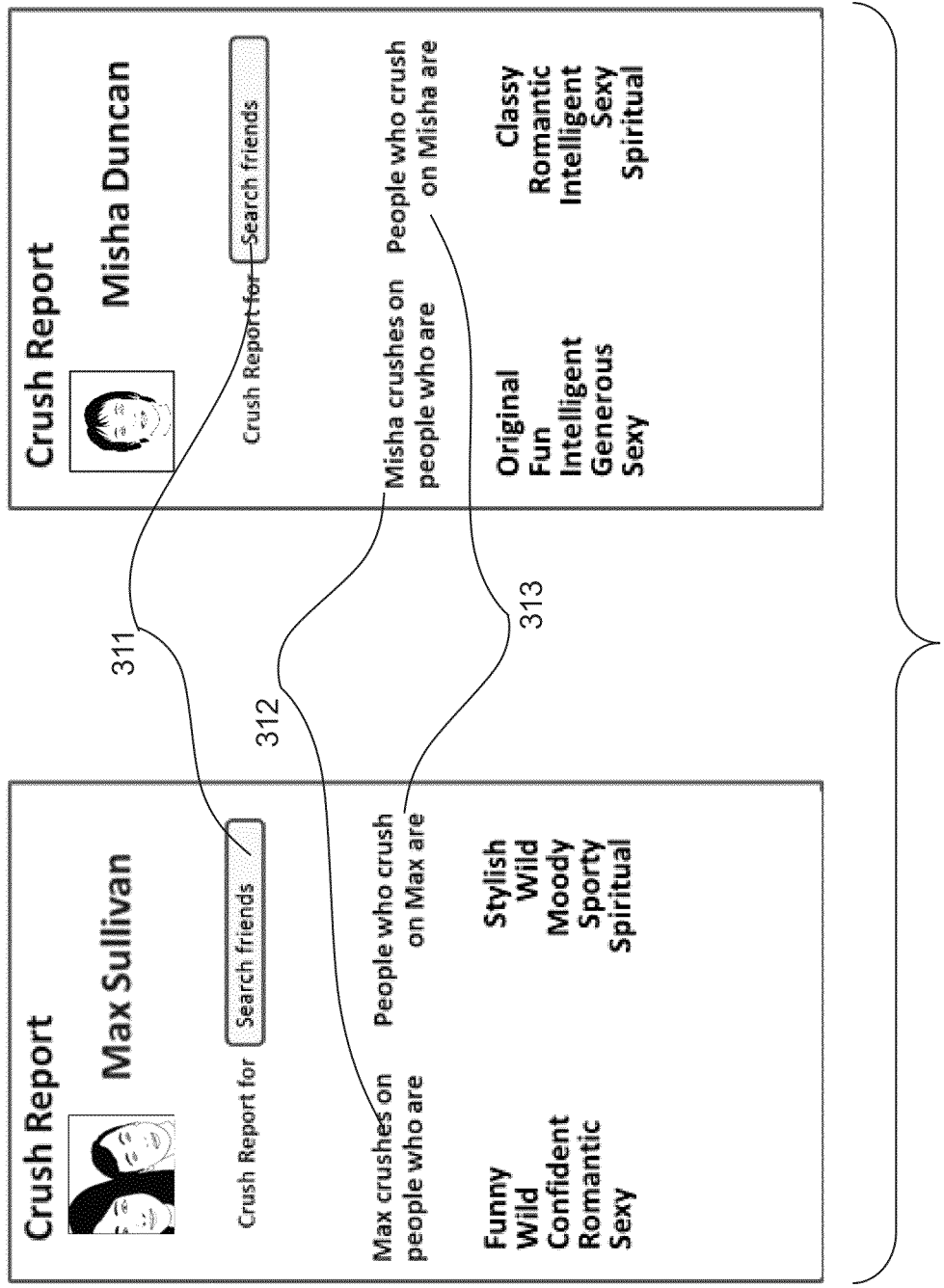
FIG. 31 shows the crush report of a friend or the user themselves.

FIG. 31 shows the crush report of a friend. In the box 311, user can search crush report for a specific friend. The Crush report shows the top traits of people that the user's friends have crush on and the top traits of people who crush on the user's friends. The first list 312 is generated by the system using the 5 most frequent traits of the people the user's friend crushes on. The second list 313 is generated by the system using the 5 most frequent traits of the people who crush on the user's friend. The user can enter their own name into the search box 311 in order to see the top traits of people who crush on them. The lists are generated the same way for the user or their friends.

Figure 32:
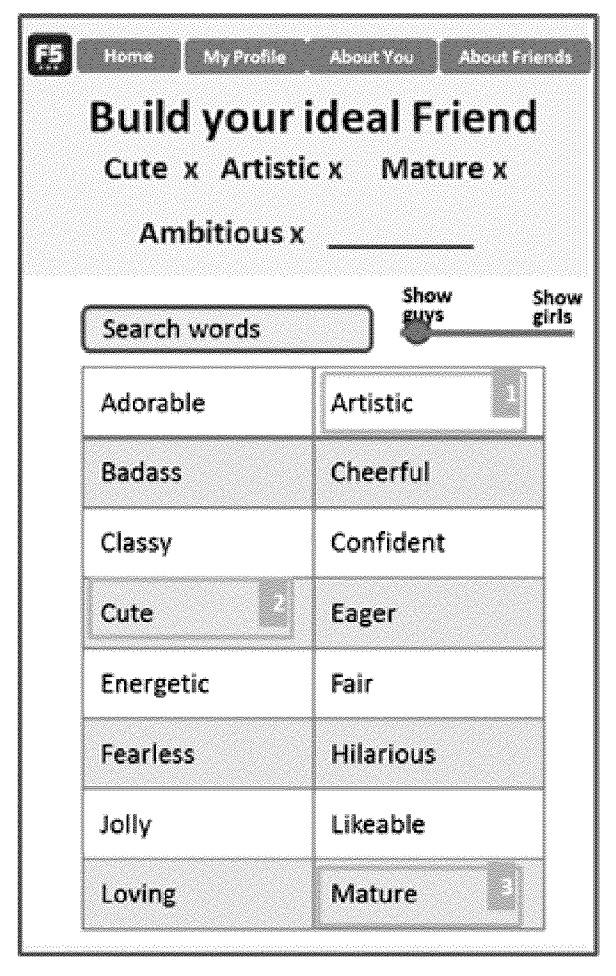

FIG. 32 shows the build a friend screen 1. It works exactly the same as the build a crush screen. User selects 5 traits they look for in their ideal friend. The user can move the slider to show just guys or just girls.

Figure 33:
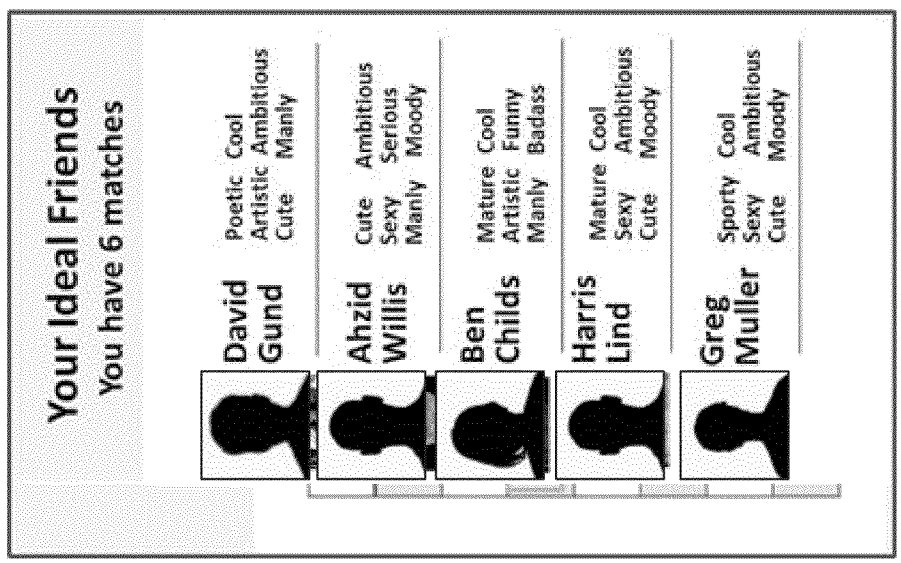
FIG. 33 shows the build a friend screen 2 (cover).

FIG. 33 shows the build a friend screen 2 (cover). This cover screen shows the ranking of all the guys or girls (based on the slider) whose top 5 words most closely match the 5 words selected. It does not list people with less than 2 matching words.

Figure 34:
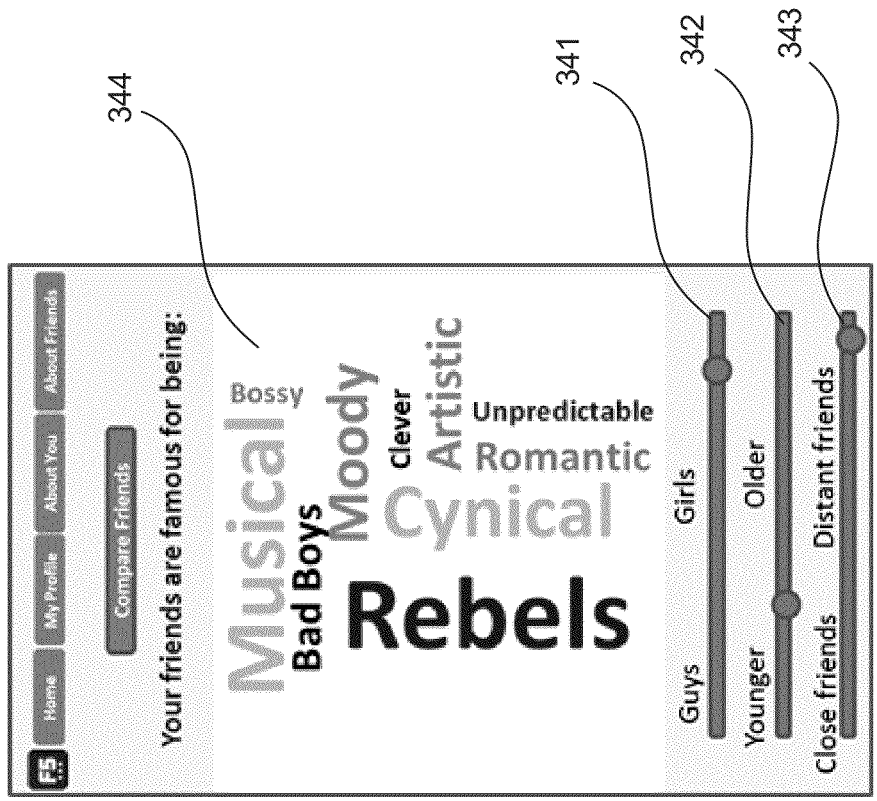
FIG. 34 shows the Clique Report-Word Cloud View.

FIG. 34 shows the Clique Report-Word Cloud View. The word cloud is based on the frequency of words that used to describe the user's friends. User can change the results of the cloud by filtering results using the sliders 341, 342, 343. The user can filter results from just males, just females, or everyone. The words grow or shrink as the slider of gender 341 is moved. User can change the results of the cloud by selecting results from older or younger users. The word cloud words grow or shrink as the slider of age 342 is moved. This scale takes the age of the youngest person to describe the user and pins that as the low. It takes the oldest person to describe the user and pins them as the high. It doesn't show the ages. The words also grow or shrink when the slider of friendship degree 343 is moved from "All" to "close friends". Close friends are the first-degree friends. Distant is the second-degree friends. All is the third-degree friends. Clicking the "compare friends button" 344 brings the user to the screen shown in FIG. 35 where the user can compare the different types of friends two people have.

Figure 35:
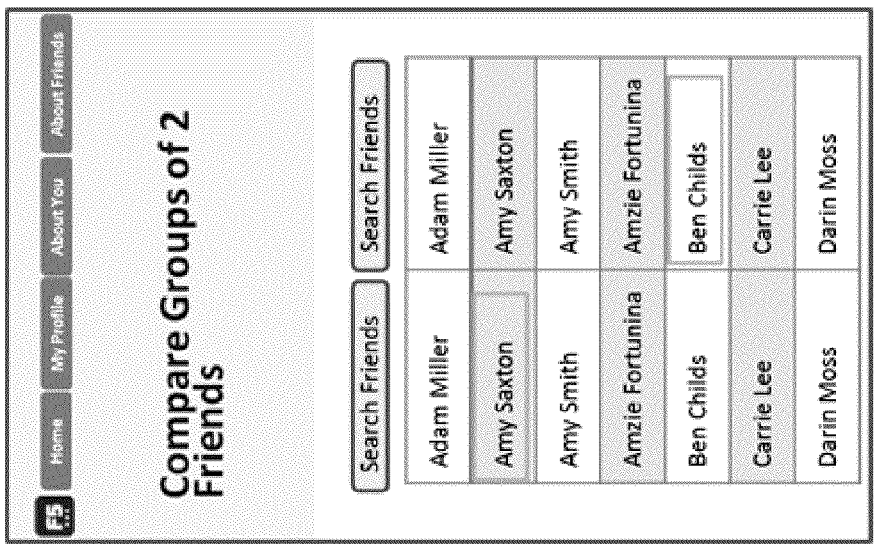
FIG. 35 shows the compare groups of two friends screen.
Figure 36:
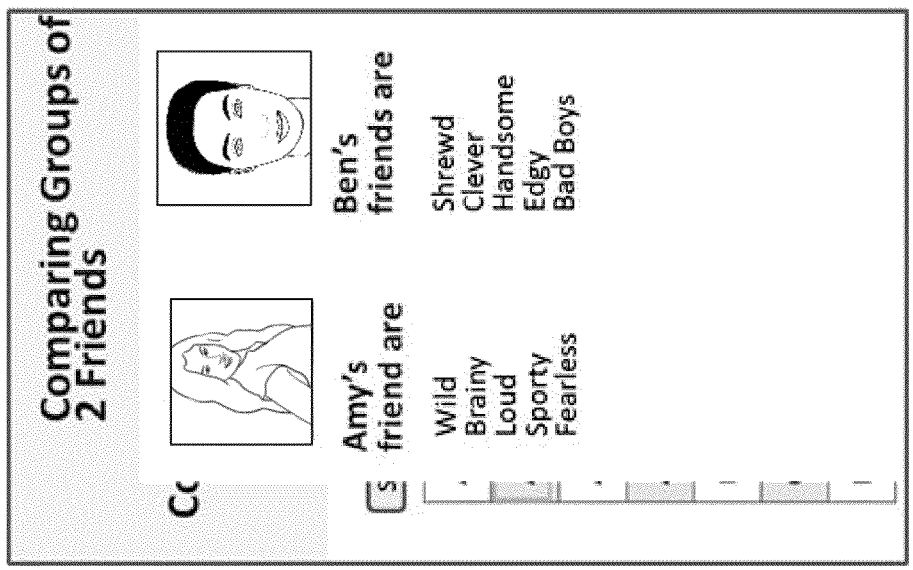
FIG. 36 that takes the top 5 most common words found among the first-degree friends of each of two friends.

FIG. 35 shows the compare groups of two friends screen. Two friends can be searched with the Compare groups of 2 friends screen. The two columns 351 scroll independently. And once two friends are selected (highlighted) a clique report—compare to screen will pop up FIG. 36 that takes the top 5 most common words found among Amy's first-degree friend and the top 5 most common words found in Ben's first-degree friends.

Figure 37:
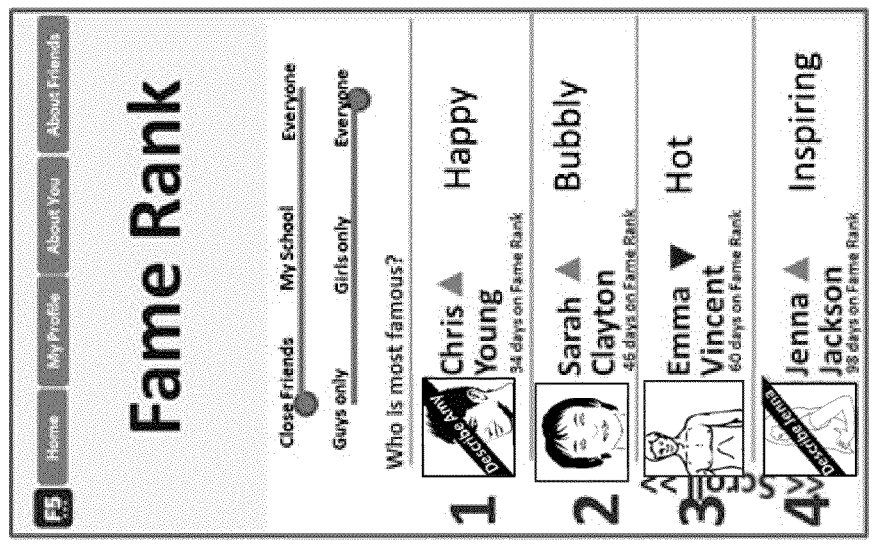
FIG. 37 shows the fame rank.

FIG. 37 shows the fame rank. Fame Rank is the total score. In some ways it's a popularity ranking. Fame rank is calculated by:

1. How many people have described the user;
2. How many trophies the user has (trophy value is weighted) as a %;
3. How many leader boards the user appears on; and
4. How many people have crushes on the user as a %.

Fame rank only shows the top 40. The user can filter fame rank by close friends ($1^{st}$ degree), schoolmates, or everyone. User can also filter fame rank by gender. Administrators have ability to easily alter the calculation for this ranking. Next to each name, there is a green up arrow to show that the person's fame rank has been rising or there is a red down arrow to show that the person's fame rank has been decreasing. In addition, how many days the person has been on the fame rank is displayed. The screen can be scrolled to go down the list of people.

Figure 38:
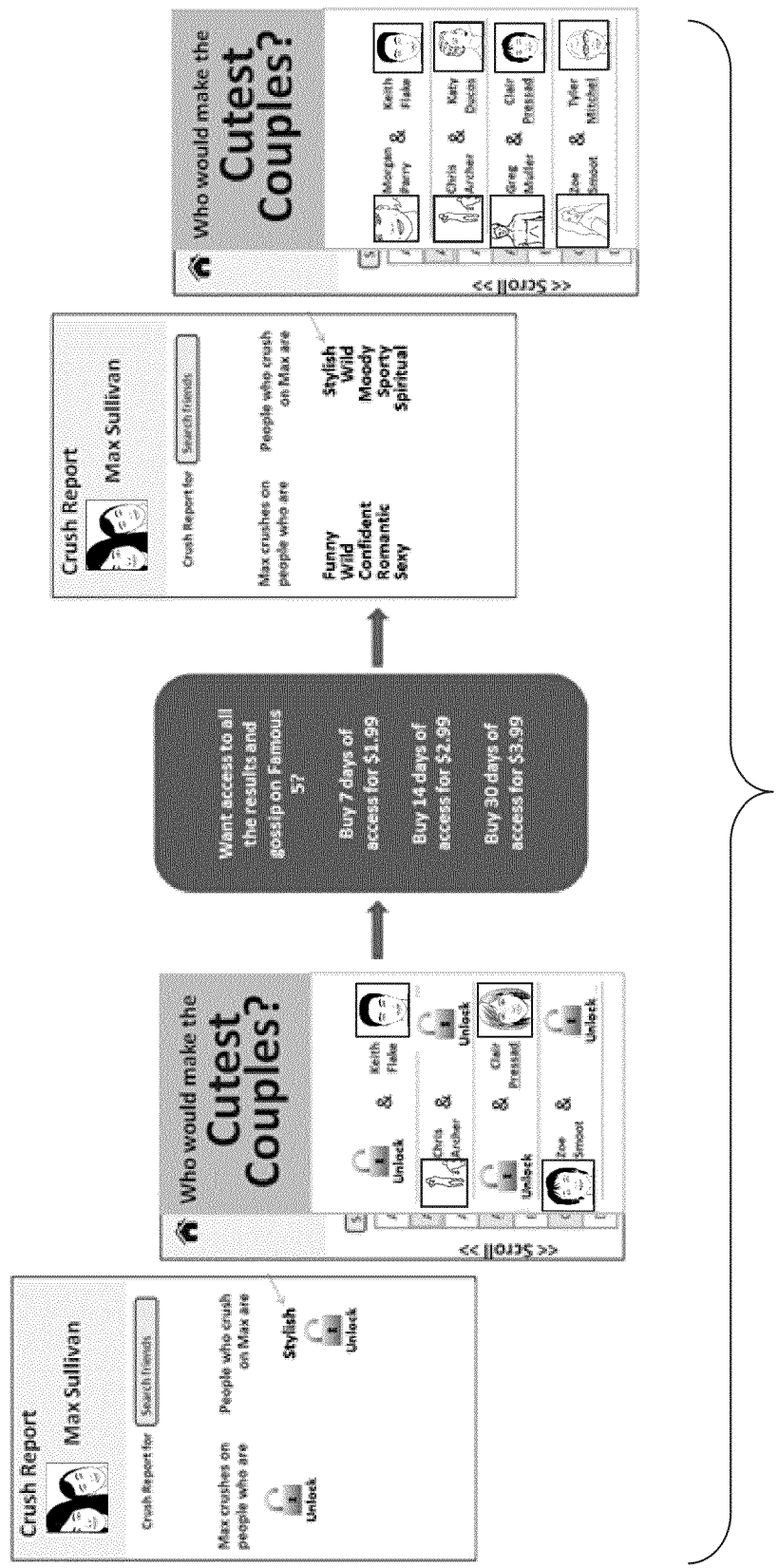
FIG. 38 illustrates the process of In-App Purchase for full reports.

FIG. 38 shows the In-App Purchase for full Reports. When the user clicks on a report that requires payment, the user sees the report but 90% of the report is locked. This 10% glimpse is meant to show the user the value of the report and motivate the user to purchase the report. After confirming the purchase with the in-app purchase screen, all reports are unlocked. There may be different business plans for the in-app purchase for the full reports. One business plan is to have the app be entirely free to start out for a time or have other promotional free periods. After a while the user will have to pay for the full report. Therefore, the in-app payment system is designed to be easily adjusted.

The software development for this system is known in the art and involves client side development, server side development, API development into other social media platforms, notification services, Admin development, in-app purchase integration, contact book integration, web hosting, scaling database architecture, scaling load testing, and QA testing.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A method of enabling users to see how others view them by providing a platform that combines word association choices with relationship structure recognition, the method comprising:
   collecting personal data of each user and relationships between the users;
   creating a list of words for the users to select from and allowing users to assign the selected words to describe themselves and one another;
   remembering, counting, and ranking the description words assigned to each user;
   remembering the relationships between users; and
   displaying the top ranked description words assigned to each user in each user's profile view;
   wherein the personal data includes but is not limited to name and gender of each user, schools each user attends or attended, and social media platform that each user uses; and the relationships are categorized in different degrees of friendship between users.

2. The method of claim 1, wherein the ranking of the description words assigned to each user can be filtered by age and gender of their friends who assigned the description words, and their friendship degree with the user so that the user can see the description words from various groups.

3. The method of claim 2, further comprising:
   creating a variety of trophies representing different characteristics for users to choose from and to assign to one another;
   allowing users to take away the trophies that they awarded to another user;
   remembering, counting, and ranking the trophies assigned to each user; and
   displaying all the trophies and how many times each trophy being given to each user in each user's profile.

4. The method of claim 3, further comprising polling users and allowing users to select a user as an answer to the poll including:
   generating a list of "who is?" questions or one "who is?" question at a time to let the users vote for the "who is" question;
   allowing users to vote for; and
   determining and displaying the results of who gets the most votes for the "who is?" question, the result can be filtered by gender and friendship degree.

5. The method of claim 4, further comprising allowing users to select which users make cute couples.

6. The method of claim 5, further comprising building the user's best friend forever (BFF) list based on the top ranked description words that the user selects to describe their ideal best friend which represent top traits that the user is looking for in their ideal friend; and displaying results of people who match with the description in ranking from the most ideal to less ideal; wherein the results can be filtered to show just guys or just girls.

7. The method of claim 6, further comprising building the user's crush report based on the top ranked description words that the user select for their crush which represent top traits that the user wants in their crush; and generating a crush report showing people whose top ranked description meets the user's description words for their crush and showing the top traits of people who have crush on the user.

8. The method of claim 7, further comprising determining who are on leader boards for each description word by calculating and determining who get the most of each description word and displaying the leader boards of each description word for users to see; wherein who are on the leader board can be filtered by gender and friendship degree, and the user can select school leader by selecting my school on a sliding scale of the friendship degree.

9. The method of claim 8, further comprising determining a fame rank and displaying the fame ranking for the users to see; wherein the fame ranking is determined by a few factors including how many people have described the user, how many trophies the user has, how many leader boards the user appears on, and how many people have crushes on the user.

10. The method of claim 9, further comprising generating different types of twins of each user based on the description words selected and trophies given by one another.

11. The method of claim 10, further comprising comparing other users based on top ranked description words for all the people compared upon the user's command; and displaying such comparison results for the user to see; wherein the user is allowed to change the results displayed to different info graphics including but not limited to bar chart, pie chart, and word cloud.

12. The method of claim 8, further comprising database queries showing how many percent of leaders of the description word describes the user with the same description word.

13. The method of claim 12, further comprising displaying on the homepage the top ranked description words, how many trophies and how many leader boards that the user has and is on, and how many people have a crush on the user.

14. The method of claim 1, comprising creating a locked report for each user of which only partial results is disclosed to the user and the locked report is fully disclosed to the user after the user makes an in-app purchase to unlock the locked report.

15. The method of claim 1, wherein when a user describe someone, the app rewards the user and tells the user how well they know the person based on following criteria including really well (3+ of user's selected words were also picked by the person), sort of (1-2 of user's words were also picked by the person), and not well (0 words were picked the person and 3+ of user's words were not picked by anyone else).

16. The method of claim 8, further comprising a mega leader board which ranks who appear on the most leader boards and which boards they are on.

17. The method of claim 11, wherein for head to head, the user picks two friends and the top ranked words for the two friends who are compared and presented in a visual representation to see where one friend has an advantage over another friend.

18. The method of claim 11, further comprising comparing groups of two friends of the user upon user's selection by taking the top five most common description words found among each of the two selected friends' close friends.

19. The method for claim 1, further comprising:
providing an app for a word-association game that shows users what they are famous for;
connecting the app to social media platforms for notifications to be displayed through the social media platforms;
enabling the app to send notifications to the user; and
enabling the app to send out invite notifications through user's phone contacts, social media platform friends, app users at the same school, twitter followers when user logs in the for the first time.

20. The method for claim 19, further comprising means for identifying duplicate profiles for the same user including:
checking each friend in the user's phone contact list for other app users;
collecting each friend's device's unique ID number (UDID, subscriber identity module and smartphone ID), and the name of the owner of each phone;
accessing the friends on social media websites;
merging the names into one name and one account if the names all match;
linking the name used in the social media websites to the ID of the phone; and
using the name used in the social media as the default name of the account thus preventing duplicate profiles.

\* \* \* \* \*